(12) United States Patent
Manssen et al.

(10) Patent No.: US 10,659,088 B2
(45) Date of Patent: *May 19, 2020

(54) METHOD AND APPARATUS FOR MANAGING OPERATIONS OF A COMMUNICATION DEVICE

(71) Applicant: NXP USA, Inc., Austin, TX (US)

(72) Inventors: Keith R. Manssen, Bull Valley, IL (US); Matthew Russell Greene, Crystal Lake, IL (US); Carsten Hoirup, Crystal Lake, IL (US)

(73) Assignee: NXP USA, INC., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/816,450

(22) Filed: Nov. 17, 2017

(65) Prior Publication Data

US 2018/0083657 A1    Mar. 22, 2018

Related U.S. Application Data

(60) Division of application No. 14/684,701, filed on Apr. 13, 2015, now Pat. No. 9,853,663, which is a
(Continued)

(51) Int. Cl.
*H04B 1/04*    (2006.01)
*H04B 1/18*    (2006.01)
(Continued)

(52) U.S. Cl.
CPC .......... *H04B 1/0458* (2013.01); *H04B 1/18* (2013.01); *H04B 7/26* (2013.01); *H04W 24/08* (2013.01);
(Continued)

(58) Field of Classification Search
CPC .. H04B 1/0458; H04B 1/0475; H04B 1/3833; H04B 1/3838; H04B 1/401; H04B 1/406; H04B 1/48; H04B 7/2618
See application file for complete search history.

(56) References Cited

U.S. PATENT DOCUMENTS 2,745,067 A    5/1956   True
3,117,279 A    1/1964   Ludvigson
(Continued)

FOREIGN PATENT DOCUMENTS

CA    2914562         6/2016
CN    101640949 A    2/2010
(Continued)

OTHER PUBLICATIONS

Canadian Office Action dated Feb. 8, 2018, application No. 2826573, 4 pages.
(Continued)

*Primary Examiner* — Golam Sorowar
(74) *Attorney, Agent, or Firm* — Guntin & Gust, PLC; Douglas Schnabel

(57) ABSTRACT

A system that incorporates teachings of the present disclosure may include, for example, a communication device having a controller to provision a matching network that controls one or more operational characteristics of one of a receiver portion and a transmitter portion of the communication device according to a profile describing one or more characteristics of a communication system from which the communication device operates. Additional embodiments are disclosed.

20 Claims, 11 Drawing Sheets

Related U.S. Application Data continuation of application No. 12/577,178, filed on Oct. 10, 2009, now Pat. No. 9,026,062.

(51) Int. Cl.
| | | |
|---|---|---|
| *H04B 7/26* | (2006.01) | |
| *H04W 24/08* | (2009.01) | |
| *H04W 84/04* | (2009.01) | |
| *H04W 84/12* | (2009.01) | |
| *H04W 88/08* | (2009.01) | |

(52) U.S. Cl.
CPC .......... *H04W 84/042* (2013.01); *H04W 84/12* (2013.01); *H04W 88/08* (2013.01)

(56) References Cited

U.S. PATENT DOCUMENTS

| | | |
|---|---|---|
| 3,160,832 A | 12/1964 | Beitman |
| 3,390,337 A | 6/1968 | Beitman |
| 3,443,231 A | 5/1969 | Roza |
| 3,509,500 A | 4/1970 | McNair |
| 3,571,716 A | 3/1971 | Hill |
| 3,590,385 A | 6/1971 | Sabo |
| 3,601,717 A | 8/1971 | Kuecken |
| 3,742,279 A | 6/1973 | Kupsky |
| 3,749,491 A | 7/1973 | Maxfield et al. |
| 3,794,941 A | 2/1974 | Templin |
| 3,919,644 A | 11/1975 | Smolka |
| 3,990,024 A | 11/1976 | Hou |
| 3,995,237 A | 11/1976 | Brunner |
| 4,186,359 A | 1/1980 | Kaegebein |
| 4,201,960 A | 5/1980 | Skutta |
| 4,227,256 A | 10/1980 | O'Keefe |
| 4,383,441 A | 5/1983 | Willis |
| 4,476,578 A | 10/1984 | Gaudin |
| 4,493,112 A | 1/1985 | Bruene |
| 4,509,019 A | 4/1985 | Banu et al. |
| 4,777,490 A | 10/1988 | Sharma |
| 4,799,066 A | 1/1989 | Deacon |
| 4,965,607 A | 10/1990 | Wilkins |
| 4,970,478 A | 11/1990 | Townley et al. |
| 4,980,656 A | 12/1990 | Duffalo |
| 5,032,805 A | 7/1991 | Elmer |
| 5,136,478 A | 8/1992 | Bruder |
| 5,142,255 A | 8/1992 | Chang |
| 5,177,670 A | 1/1993 | Shinohara |
| 5,195,045 A | 3/1993 | Keane |
| 5,200,826 A | 4/1993 | Seong |
| 5,212,463 A | 5/1993 | Babbitt |
| 5,215,463 A | 5/1993 | Babbitt |
| 5,216,392 A | 6/1993 | Fraser et al. |
| 5,230,091 A | 7/1993 | Vaisanen et al. |
| 5,243,358 A | 9/1993 | Sanford |
| 5,258,728 A | 11/1993 | Taniyoshi |
| 5,276,912 A | 1/1994 | Siwiak |
| 5,301,358 A | 4/1994 | Gaskill |
| 5,307,033 A | 4/1994 | Koscica |
| 5,310,358 A | 5/1994 | Johnson |
| 5,312,790 A | 5/1994 | Sengupta |
| 5,334,958 A | 8/1994 | Babbitt |
| 5,361,403 A | 11/1994 | Dent |
| 5,371,473 A | 12/1994 | Trinh |
| 5,409,889 A | 4/1995 | Das |
| 5,427,988 A | 6/1995 | Sengupta |
| 5,430,417 A | 7/1995 | Martin |
| 5,446,447 A | 8/1995 | Carney |
| 5,448,252 A | 9/1995 | Ali |
| 5,451,567 A | 9/1995 | Das |
| 5,451,914 A | 9/1995 | Stengel |
| 5,457,394 A | 10/1995 | McEwan |
| 5,472,935 A | 12/1995 | Yandrofski |
| 5,479,139 A | 12/1995 | Koscica |
| 5,486,491 A | 1/1996 | Sengupta |
| 5,496,795 A | 3/1996 | Das |
| 5,502,372 A | 3/1996 | Quan |
| 5,524,281 A | 6/1996 | Bradley |
| 5,548,837 A | 8/1996 | Hess et al. |
| 5,561,086 A | 10/1996 | Cygan |
| 5,561,407 A | 10/1996 | Koscica |
| 5,564,086 A | 10/1996 | Cygan |
| 5,583,359 A | 12/1996 | Ng et al. |
| 5,589,844 A | 12/1996 | Belcher et al. |
| 5,593,495 A | 1/1997 | Masuda |
| 5,635,433 A | 6/1997 | Sengupta |
| 5,635,434 A | 6/1997 | Sengupta |
| 5,640,042 A | 6/1997 | Koscica |
| 5,679,624 A | 10/1997 | Das |
| 5,689,219 A | 11/1997 | Piirainen |
| 5,693,429 A | 12/1997 | Sengupta |
| 5,694,134 A | 12/1997 | Barnes |
| 5,699,071 A | 12/1997 | Urakami |
| 5,721,194 A | 2/1998 | Yandrofski |
| 5,766,697 A | 6/1998 | Sengupta |
| 5,777,581 A | 7/1998 | Lilly |
| 5,778,308 A | 7/1998 | Sroka |
| 5,786,727 A | 7/1998 | Sigmon |
| 5,812,572 A | 9/1998 | King |
| 5,812,943 A | 9/1998 | Suzuki |
| 5,830,591 A | 11/1998 | Sengupta |
| 5,846,893 A | 12/1998 | Sengupta |
| 5,874,926 A | 2/1999 | Tsuru |
| 5,880,635 A | 3/1999 | Satoh |
| 5,886,867 A | 3/1999 | Chivukula |
| 5,892,482 A | 4/1999 | Coleman et al. |
| 5,926,751 A | 7/1999 | Vlahos et al. |
| 5,929,717 A | 7/1999 | Richardson |
| 5,940,030 A | 8/1999 | Hampel et al. |
| 5,963,871 A | 10/1999 | Zhinong |
| 5,969,582 A | 10/1999 | Boesch |
| 5,973,568 A | 10/1999 | Shapiro et al. |
| 5,982,099 A | 11/1999 | Barnes et al. |
| 5,990,766 A | 11/1999 | Zhang |
| 6,008,759 A | 12/1999 | Tangemann et al. |
| 6,009,124 A | 12/1999 | Smith |
| 6,020,787 A | 2/2000 | Kim |
| 6,020,795 A | 2/2000 | Kim |
| 6,029,075 A | 2/2000 | Das |
| 6,045,932 A | 4/2000 | Jia |
| 6,061,025 A | 5/2000 | Jackson |
| 6,064,865 A | 5/2000 | Kuo et al. |
| 6,074,971 A | 6/2000 | Chiu |
| 6,096,127 A | 8/2000 | Dimos |
| 6,100,733 A | 8/2000 | Dortu |
| 6,101,102 A | 8/2000 | Brand |
| 6,115,585 A | 9/2000 | Matero |
| 6,125,266 A | 9/2000 | Matero et al. |
| 6,133,868 A | 10/2000 | Butler et al. |
| 6,133,883 A | 10/2000 | Munson |
| 6,172,385 B1 | 1/2001 | Duncombe |
| 6,215,644 B1 | 4/2001 | Dhuler |
| 6,242,989 B1 | 6/2001 | Barber |
| 6,266,528 B1 | 7/2001 | Farzaneh |
| 6,281,748 B1 | 8/2001 | Klomsdorf et al. |
| 6,281,847 B1 | 8/2001 | Lee |
| 6,309,895 B1 | 10/2001 | Jaing |
| 6,343,208 B1 | 1/2002 | Ying |
| 6,377,142 B1 | 4/2002 | Chiu |
| 6,377,217 B1 | 4/2002 | Zhu |
| 6,377,440 B1 | 4/2002 | Zhu |
| 6,384,785 B1 | 5/2002 | Kamogawa |
| 6,404,614 B1 | 6/2002 | Zhu |
| 6,408,190 B1 | 6/2002 | Ying |
| 6,414,562 B1 | 7/2002 | Bouisse |
| 6,415,562 B1 | 7/2002 | Donaghue |
| 6,438,360 B1 | 8/2002 | Alberth, Jr. et al. |
| 6,452,776 B1 | 9/2002 | Chakravorty |
| 6,461,930 B2 | 10/2002 | Akram |
| 6,466,774 B1 | 10/2002 | Okabe |
| 6,492,883 B2 | 12/2002 | Liang |
| 6,514,895 B1 | 2/2003 | Chiu |
| 6,525,630 B1 | 2/2003 | Zhu |
| 6,531,936 B1 | 3/2003 | Chiu |
| 6,535,076 B2 | 3/2003 | Partridge |
| 6,535,722 B1 | 3/2003 | Rosen |

(56) References Cited

U.S. PATENT DOCUMENTS

| | | | |
|---|---|---|---|
| 6,538,603 B1 | 3/2003 | Chen |
| 6,556,102 B1 | 4/2003 | Sengupta |
| 6,556,814 B1 | 4/2003 | Klomsdorf |
| 6,570,462 B2 | 5/2003 | Edmonson |
| 6,590,468 B2 | 7/2003 | du Toit |
| 6,590,541 B1 | 7/2003 | Schultze |
| 6,597,265 B2 | 7/2003 | Liang |
| 6,608,603 B2 | 8/2003 | Alexopoulos |
| 6,624,786 B2 | 9/2003 | Boyle |
| 6,628,962 B1 * | 9/2003 | Katsura ............... H01Q 1/084 |
| | | | 455/553.1 |
| 6,640,085 B1 | 10/2003 | Chatzipetros |
| 6,657,595 B1 | 12/2003 | Phillips |
| 6,661,638 B2 | 12/2003 | Jackson |
| 6,670,256 B2 | 12/2003 | Yang |
| 6,710,651 B2 | 3/2004 | Forrester |
| 6,724,611 B1 | 4/2004 | Mosley |
| 6,724,890 B1 | 4/2004 | Bareis |
| 6,737,179 B2 | 5/2004 | Sengupta |
| 6,747,522 B2 | 6/2004 | Pietruszynski et al. |
| 6,759,918 B2 | 7/2004 | Du Toit |
| 6,765,540 B2 | 7/2004 | Toncich |
| 6,768,472 B2 | 7/2004 | Alexopoulos |
| 6,774,077 B2 | 8/2004 | Sengupta |
| 6,795,712 B1 | 9/2004 | Vakilian |
| 6,825,818 B2 | 11/2004 | Toncich |
| 6,839,028 B2 | 1/2005 | Lee |
| 6,845,126 B2 | 1/2005 | Dent |
| 6,859,104 B2 | 2/2005 | Toncich |
| 6,862,432 B1 | 3/2005 | Kim |
| 6,864,757 B2 | 3/2005 | Du Toit |
| 6,868,260 B2 | 3/2005 | Jagielski |
| 6,875,655 B2 | 4/2005 | Lin |
| 6,882,245 B2 | 4/2005 | Utsunomiya |
| 6,888,714 B2 | 5/2005 | Shaw |
| 6,905,989 B2 | 6/2005 | Ellis |
| 6,906,653 B2 | 6/2005 | Uno |
| 6,907,234 B2 | 6/2005 | Karr |
| 6,914,487 B1 | 7/2005 | Doyle et al. |
| 6,920,315 B1 | 7/2005 | Wilcox et al. |
| 6,922,330 B2 | 7/2005 | Nielsen |
| 6,943,078 B1 | 9/2005 | Zheng |
| 6,946,847 B2 | 9/2005 | Nishimori |
| 6,949,442 B2 | 9/2005 | Barth |
| 6,961,368 B2 | 11/2005 | Dent |
| 6,964,296 B2 | 11/2005 | Memory |
| 6,965,837 B2 | 11/2005 | Vintola |
| 6,987,493 B2 | 1/2006 | Chen |
| 6,993,297 B2 | 1/2006 | Smith |
| 6,999,297 B1 | 2/2006 | Klee |
| 7,009,455 B2 | 3/2006 | Toncich |
| 7,071,776 B2 | 7/2006 | Forrester |
| 7,106,715 B1 | 9/2006 | Kelton |
| 7,107,033 B2 | 9/2006 | du Toit |
| 7,113,614 B2 | 9/2006 | Rhoads |
| 7,151,411 B2 | 12/2006 | Martin |
| 7,176,634 B2 | 2/2007 | Kitamura |
| 7,176,845 B2 | 2/2007 | Fabrega-Sanchez |
| 7,180,467 B2 | 2/2007 | Fabrega-Sanchez |
| 7,218,186 B2 | 5/2007 | Chen et al. |
| 7,221,327 B2 | 5/2007 | Toncich |
| 7,298,329 B2 | 11/2007 | Diament |
| 7,299,018 B2 | 11/2007 | Van Rumpt |
| 7,312,118 B2 | 12/2007 | Kiyotoshi |
| 7,332,980 B2 | 2/2008 | Zhu |
| 7,332,981 B2 | 2/2008 | Matsuno |
| 7,339,527 B2 | 3/2008 | Sager |
| 7,369,828 B2 | 5/2008 | Shamsaifar |
| 7,426,373 B2 | 9/2008 | Clingman |
| 7,427,949 B2 | 9/2008 | Channabasappa et al. |
| 7,453,405 B2 | 11/2008 | Nishikido et al. |
| 7,468,638 B1 | 12/2008 | Tsai |
| 7,469,129 B2 | 12/2008 | Blaker et al. |
| 7,502,598 B2 | 3/2009 | Kronberger et al. |
| 7,528,674 B2 | 5/2009 | Kato et al. |
| 7,531,011 B2 | 5/2009 | Yamasaki |
| 7,535,080 B2 | 5/2009 | Zeng et al. |
| 7,535,312 B2 | 5/2009 | McKinzie |
| 7,539,527 B2 | 5/2009 | Jang |
| 7,557,507 B2 | 7/2009 | Wu |
| 7,567,782 B2 | 7/2009 | Liu et al. |
| 7,596,357 B2 | 9/2009 | Nakamata |
| 7,633,355 B2 | 12/2009 | Matsuo |
| 7,642,879 B2 | 1/2010 | Matsuno |
| 7,655,530 B2 | 2/2010 | Hosking |
| 7,667,663 B2 | 2/2010 | Hsiao |
| 7,671,693 B2 | 3/2010 | Brobston et al. |
| 7,705,692 B2 | 4/2010 | Fukamachi et al. |
| 7,711,337 B2 | 5/2010 | McKinzie |
| 7,714,676 B2 | 5/2010 | McKinzie |
| 7,714,678 B2 | 5/2010 | du Toit |
| 7,728,693 B2 | 6/2010 | du Toit et al. |
| 7,760,699 B1 | 7/2010 | Malik |
| 7,768,400 B2 | 8/2010 | Lawrence et al. |
| 7,786,819 B2 | 8/2010 | Ella |
| 7,795,990 B2 | 9/2010 | du Toit |
| 7,830,320 B2 | 11/2010 | Shamblin et al. |
| 7,852,170 B2 | 12/2010 | McKinzie |
| 7,856,228 B2 | 12/2010 | Lekutai et al. |
| 7,865,154 B2 | 1/2011 | Mendolia |
| 7,907,094 B2 | 3/2011 | Kakitsu et al. |
| 7,917,104 B2 | 3/2011 | Manssen et al. |
| 7,940,223 B2 | 5/2011 | Dou et al. |
| 7,949,309 B2 | 5/2011 | Rofougaran |
| 7,969,257 B2 | 6/2011 | du Toit |
| 7,983,615 B2 | 7/2011 | Bryce et al. |
| 7,991,363 B2 | 8/2011 | Greene |
| 8,008,982 B2 | 8/2011 | McKinzie |
| 8,072,285 B2 | 12/2011 | Spears |
| 8,112,043 B2 | 2/2012 | Knudsen et al. |
| 8,170,510 B2 | 5/2012 | Knudsen et al. |
| 8,190,109 B2 | 5/2012 | Ali et al. |
| 8,204,446 B2 | 6/2012 | Scheer |
| 8,213,886 B2 | 7/2012 | Blin |
| 8,217,731 B2 | 7/2012 | McKinzie et al. |
| 8,217,732 B2 | 7/2012 | McKinzie |
| 8,299,867 B2 | 10/2012 | McKinzie |
| 8,320,850 B1 | 11/2012 | Khlat |
| 8,325,097 B2 | 12/2012 | McKinzie, III et al. |
| 8,405,563 B2 | 3/2013 | McKinzie et al. |
| 8,421,548 B2 | 4/2013 | Spears et al. |
| 8,432,234 B2 | 4/2013 | Manssen et al. |
| 8,442,457 B2 | 5/2013 | Harel et al. |
| 8,454,882 B2 | 6/2013 | Chan et al. |
| 8,457,569 B2 | 6/2013 | Blin |
| 8,472,888 B2 | 6/2013 | Manssen et al. |
| 8,478,344 B2 | 7/2013 | Rofougaran et al. |
| 8,543,123 B2 | 9/2013 | Moon et al. |
| 8,543,176 B1 | 9/2013 | Daniel et al. |
| 8,558,633 B2 | 10/2013 | Mckinzie, III |
| 8,564,381 B2 | 10/2013 | McKinzie |
| 8,594,584 B2 | 11/2013 | Greene et al. |
| 8,620,236 B2 | 12/2013 | Manssen et al. |
| 8,620,246 B2 | 12/2013 | McKinzie et al. |
| 8,620,247 B2 | 12/2013 | McKinzie et al. |
| 8,655,286 B2 | 2/2014 | Mendolia |
| 8,674,783 B2 | 3/2014 | Spears et al. |
| 8,680,934 B2 | 3/2014 | McKinzie et al. |
| 8,693,963 B2 | 4/2014 | du Toit et al. |
| 8,712,340 B2 | 4/2014 | Hoirup et al. |
| 8,712,348 B2 | 4/2014 | Brobston et al. |
| 8,773,019 B2 | 7/2014 | Pham et al. |
| 8,774,743 B2 | 7/2014 | Ali et al. |
| 8,787,845 B2 | 7/2014 | Manssen et al. |
| 8,803,631 B2 | 8/2014 | Greene et al. |
| 8,860,525 B2 | 10/2014 | Spears et al. |
| 8,948,889 B2 | 2/2015 | Spears et al. |
| 8,957,742 B2 | 2/2015 | Spears et al. |
| 9,026,062 B2 | 5/2015 | Greene et al. |
| 9,083,405 B2 | 7/2015 | Christoffersson et al. |
| 9,119,152 B2 | 8/2015 | Blin |
| 9,231,643 B2 | 1/2016 | Greene et al. |
| 9,374,113 B2 | 6/2016 | Manssen et al. |
| 9,379,454 B2 | 6/2016 | Rabe et al. |

(56) References Cited

U.S. PATENT DOCUMENTS

| | | |
|---|---|---|
| 9,473,194 B2 | 10/2016 | Domino et al. |
| 9,698,758 B2 | 7/2017 | Spears et al. |
| 9,698,858 B2 | 7/2017 | Hoirup et al. |
| 9,742,375 B2 | 8/2017 | Manssen et al. |
| 9,762,416 B2 | 9/2017 | Mandegaran et al. |
| 9,768,752 B2 | 9/2017 | du Toit et al. |
| 9,768,810 B2 | 9/2017 | Greene et al. |
| 9,853,363 B2 | 12/2017 | Ali et al. |
| 9,935,674 B2 | 4/2018 | Hoirup et al. |
| 2002/0008672 A1 | 1/2002 | Gothard et al. |
| 2002/0030566 A1 | 3/2002 | Bozler |
| 2002/0047154 A1 | 4/2002 | Sowlati et al. |
| 2002/0058539 A1* | 5/2002 | Underbrink ........... H01Q 1/245 455/575.7 |
| 2002/0079982 A1 | 6/2002 | Lafleur et al. |
| 2002/0109642 A1 | 8/2002 | Gee et al. |
| 2002/0118075 A1 | 8/2002 | Ohwada |
| 2002/0145483 A1 | 10/2002 | Bouisse |
| 2002/0167963 A1 | 11/2002 | Joa-Ng |
| 2002/0183013 A1 | 12/2002 | Auckland et al. |
| 2002/0187780 A1 | 12/2002 | Souissi |
| 2002/0191703 A1 | 12/2002 | Ling |
| 2002/0193088 A1 | 12/2002 | Jung |
| 2003/0060227 A1 | 3/2003 | Sekine |
| 2003/0064732 A1* | 4/2003 | McDowell ........... H04B 1/3838 455/456.1 |
| 2003/0071300 A1 | 4/2003 | Yashima |
| 2003/0114124 A1 | 6/2003 | Higuchi |
| 2003/0137464 A1 | 7/2003 | Foti et al. |
| 2003/0142022 A1 | 7/2003 | Ollikainen |
| 2003/0184319 A1 | 10/2003 | Nishimori et al. |
| 2003/0193997 A1 | 10/2003 | Dent |
| 2003/0199286 A1 | 10/2003 | du Toit |
| 2003/0210203 A1 | 11/2003 | Phillips et al. |
| 2003/0210206 A1 | 11/2003 | Phillips et al. |
| 2003/0216150 A1 | 11/2003 | Ueda |
| 2003/0232607 A1 | 12/2003 | Le Bars |
| 2004/0009754 A1 | 1/2004 | Smith, Jr. et al. |
| 2004/0090372 A1 | 5/2004 | Nallo |
| 2004/0100341 A1 | 5/2004 | Luetzelschwab |
| 2004/0125027 A1 | 7/2004 | Rubinshteyn et al. |
| 2004/0127178 A1 | 7/2004 | Kuffner |
| 2004/0137950 A1 | 7/2004 | Bolin |
| 2004/0202399 A1 | 10/2004 | Kochergin |
| 2004/0204027 A1 | 10/2004 | Park et al. |
| 2004/0227176 A1 | 11/2004 | York |
| 2004/0232982 A1 | 11/2004 | Ichitsubo et al. |
| 2004/0257293 A1 | 12/2004 | Friedrich |
| 2004/0263411 A1 | 12/2004 | Fabrega-Sanchez et al. |
| 2004/0264610 A1 | 12/2004 | Marro et al. |
| 2005/0007291 A1 | 1/2005 | Fabrega-Sanchez |
| 2005/0032488 A1 | 2/2005 | Pehlke |
| 2005/0032541 A1 | 2/2005 | Wang |
| 2005/0042994 A1 | 2/2005 | Otaka |
| 2005/0059362 A1 | 3/2005 | Kalajo et al. |
| 2005/0082636 A1 | 4/2005 | Yashima |
| 2005/0083234 A1 | 4/2005 | Poilasne et al. |
| 2005/0085204 A1 | 4/2005 | Poilasne et al. |
| 2005/0093624 A1 | 5/2005 | Forrester et al. |
| 2005/0130608 A1 | 6/2005 | Forse |
| 2005/0130699 A1 | 6/2005 | Kim |
| 2005/0145987 A1 | 7/2005 | Okuda et al. |
| 2005/0208960 A1 | 9/2005 | Hassan |
| 2005/0215204 A1 | 9/2005 | Wallace |
| 2005/0227627 A1 | 10/2005 | Cyr et al. |
| 2005/0227633 A1 | 10/2005 | Dunko |
| 2005/0259011 A1 | 11/2005 | Vance |
| 2005/0260962 A1 | 11/2005 | Nazrul et al. |
| 2005/0264455 A1 | 11/2005 | Talvitie |
| 2005/0280588 A1 | 12/2005 | Fujikawa et al. |
| 2005/0282503 A1 | 12/2005 | Onno |
| 2006/0003537 A1 | 1/2006 | Sinha |
| 2006/0009165 A1 | 1/2006 | Alles |
| 2006/0022882 A1 | 2/2006 | Gerder et al. |
| 2006/0030277 A1 | 2/2006 | Cyr et al. |
| 2006/0077082 A1 | 4/2006 | Shanks et al. |
| 2006/0084392 A1 | 4/2006 | Marholev et al. |
| 2006/0099915 A1 | 5/2006 | Laroia et al. |
| 2006/0099952 A1 | 5/2006 | Prehofer et al. |
| 2006/0119511 A1 | 6/2006 | Collinson et al. |
| 2006/0148415 A1 | 7/2006 | Hamalainen et al. |
| 2006/0160501 A1 | 7/2006 | Mendolia |
| 2006/0183431 A1 | 8/2006 | Chang et al. |
| 2006/0183433 A1 | 8/2006 | Mori et al. |
| 2006/0183442 A1 | 8/2006 | Chang et al. |
| 2006/0195161 A1 | 8/2006 | Li et al. |
| 2006/0205368 A1 | 9/2006 | Bustamante |
| 2006/0223451 A1 | 10/2006 | Posamentier |
| 2006/0252391 A1 | 11/2006 | Poilasne et al. |
| 2006/0281423 A1 | 12/2006 | Caimi |
| 2007/0001924 A1 | 1/2007 | Hirabayashi et al. |
| 2007/0013483 A1 | 1/2007 | Stewart |
| 2007/0035458 A1 | 2/2007 | Ohba et al. |
| 2007/0042725 A1 | 2/2007 | Poilasne et al. |
| 2007/0042734 A1 | 2/2007 | Ryu |
| 2007/0063788 A1 | 3/2007 | Zhu |
| 2007/0077956 A1 | 4/2007 | Julian et al. |
| 2007/0080888 A1 | 4/2007 | Mohamadi |
| 2007/0082611 A1 | 4/2007 | Terranova et al. |
| 2007/0085609 A1 | 4/2007 | Itkin et al. |
| 2007/0091006 A1 | 4/2007 | Thober et al. |
| 2007/0093282 A1 | 4/2007 | Chang et al. |
| 2007/0109716 A1 | 5/2007 | Martin et al. |
| 2007/0111681 A1 | 5/2007 | Alberth et al. |
| 2007/0121267 A1 | 5/2007 | Kotani et al. |
| 2007/0142011 A1 | 6/2007 | Shatara |
| 2007/0142014 A1 | 6/2007 | Wilcox |
| 2007/0149146 A1 | 6/2007 | Hwang |
| 2007/0171879 A1 | 7/2007 | Bourque |
| 2007/0182636 A1 | 8/2007 | Carlson |
| 2007/0184825 A1 | 8/2007 | Lim et al. |
| 2007/0194859 A1 | 8/2007 | Brobston et al. |
| 2007/0197180 A1 | 8/2007 | McKinzie et al. |
| 2007/0200766 A1 | 8/2007 | McKinzie |
| 2007/0200773 A1 | 8/2007 | Dou et al. |
| 2007/0210899 A1 | 9/2007 | Kato et al. |
| 2007/0222697 A1 | 9/2007 | Caimi et al. |
| 2007/0248238 A1 | 10/2007 | Abreu et al. |
| 2007/0285326 A1 | 12/2007 | McKinzie |
| 2007/0293176 A1 | 12/2007 | Yu |
| 2008/0007478 A1 | 1/2008 | Jung |
| 2008/0018541 A1 | 1/2008 | Pang |
| 2008/0030165 A1 | 2/2008 | Lisac et al. |
| 2008/0051096 A1 | 2/2008 | Rao et al. |
| 2008/0055016 A1 | 3/2008 | Morris |
| 2008/0055168 A1 | 3/2008 | Massey et al. |
| 2008/0081670 A1 | 4/2008 | Rofougaran |
| 2008/0090539 A1 | 4/2008 | Thompson |
| 2008/0090573 A1 | 4/2008 | Kim et al. |
| 2008/0094149 A1 | 4/2008 | Brobston |
| 2008/0106350 A1 | 5/2008 | McKinzie |
| 2008/0111748 A1 | 5/2008 | Dunn et al. |
| 2008/0122553 A1 | 5/2008 | McKinzie |
| 2008/0122723 A1 | 5/2008 | Rofougaran |
| 2008/0129612 A1 | 6/2008 | Wang |
| 2008/0158076 A1 | 7/2008 | Walley |
| 2008/0174508 A1 | 7/2008 | Iwai et al. |
| 2008/0261544 A1 | 10/2008 | Blin |
| 2008/0266190 A1 | 10/2008 | Ohba et al. |
| 2008/0274706 A1 | 11/2008 | Blin et al. |
| 2008/0280570 A1 | 11/2008 | Blin |
| 2008/0285729 A1 | 11/2008 | Glasgow et al. |
| 2008/0288028 A1 | 11/2008 | Larson et al. |
| 2008/0294718 A1 | 11/2008 | Okano |
| 2008/0300027 A1 | 12/2008 | Dou |
| 2008/0305749 A1 | 12/2008 | Ben-Bassat |
| 2008/0305750 A1 | 12/2008 | Alon et al. |
| 2008/0309617 A1 | 12/2008 | Kong et al. |
| 2009/0002077 A1 | 1/2009 | Rohani et al. |
| 2009/0016124 A1 | 1/2009 | Kim |
| 2009/0027286 A1 | 1/2009 | Ohishi |
| 2009/0039976 A1 | 2/2009 | McKinzie, III |
| 2009/0051604 A1 | 2/2009 | Zhang et al. |
| 2009/0051611 A1 | 2/2009 | Shamblin et al. |

(56) References Cited

U.S. PATENT DOCUMENTS

| | | |
|---|---|---|
| 2009/0079656 A1 | 3/2009 | Peyla et al. |
| 2009/0082017 A1 | 3/2009 | Chang et al. |
| 2009/0088093 A1 | 4/2009 | Nentwig et al. |
| 2009/0109880 A1 | 4/2009 | Kim |
| 2009/0121963 A1* | 5/2009 | Greene ............... H03H 7/40 343/861 |
| 2009/0149136 A1 | 6/2009 | Rofougaran |
| 2009/0180403 A1 | 7/2009 | Tudosoiu |
| 2009/0184879 A1 | 7/2009 | Derneryd |
| 2009/0196192 A1 | 8/2009 | Lim et al. |
| 2009/0215446 A1 | 8/2009 | Hapsari et al. |
| 2009/0231220 A1 | 9/2009 | Zhang et al. |
| 2009/0253385 A1 | 10/2009 | Dent et al. |
| 2009/0264065 A1 | 10/2009 | Song |
| 2009/0278685 A1 | 11/2009 | Potyrailo |
| 2009/0295651 A1 | 12/2009 | Dou et al. |
| 2009/0305742 A1* | 12/2009 | Caballero ............ H04B 1/3838 455/566 |
| 2009/0323572 A1 | 12/2009 | Shi et al. |
| 2009/0323582 A1 | 12/2009 | Proctor et al. |
| 2010/0041348 A1 | 2/2010 | Wilcox et al. |
| 2010/0053009 A1 | 3/2010 | Rofougaran |
| 2010/0060531 A1 | 3/2010 | Rappaport |
| 2010/0069011 A1 | 3/2010 | Carrick et al. |
| 2010/0073103 A1 | 3/2010 | Spears et al. |
| 2010/0085260 A1 | 4/2010 | McKinzie |
| 2010/0085884 A1 | 4/2010 | Srinivisan et al. |
| 2010/0105425 A1* | 4/2010 | Asokan ................ H04B 1/0458 455/552.1 |
| 2010/0107067 A1 | 4/2010 | Vaisanen et al. |
| 2010/0134215 A1 | 6/2010 | Lee et al. |
| 2010/0156552 A1 | 6/2010 | McKinzie |
| 2010/0164640 A1 | 7/2010 | McKinzie |
| 2010/0164641 A1 | 7/2010 | McKinzie |
| 2010/0201598 A1 | 8/2010 | Lau et al. |
| 2010/0214189 A1 | 8/2010 | Kanazawa |
| 2010/0232474 A1 | 9/2010 | Rofougaran et al. |
| 2010/0244576 A1 | 9/2010 | Hillan et al. |
| 2010/0277363 A1 | 11/2010 | Kainulainen et al. |
| 2010/0285836 A1 | 11/2010 | Horihata et al. |
| 2010/0302106 A1 | 12/2010 | Knudsen et al. |
| 2010/0304684 A1 | 12/2010 | Duron et al. |
| 2010/0304688 A1 | 12/2010 | Knudsen |
| 2010/0308933 A1 | 12/2010 | See et al. |
| 2011/0002080 A1 | 1/2011 | Ranta |
| 2011/0012790 A1 | 1/2011 | Badaruzzaman |
| 2011/0012792 A1 | 1/2011 | Krenz |
| 2011/0014879 A1 | 1/2011 | Alberth et al. |
| 2011/0014886 A1 | 1/2011 | Manssen |
| 2011/0019606 A1 | 1/2011 | Umeda et al. |
| 2011/0026415 A1 | 2/2011 | Kamuf et al. |
| 2011/0039504 A1 | 2/2011 | Nguyen et al. |
| 2011/0043298 A1 | 2/2011 | McKinzie |
| 2011/0043328 A1 | 2/2011 | Bassali |
| 2011/0053524 A1 | 3/2011 | Manssen |
| 2011/0063042 A1 | 3/2011 | Mendolia |
| 2011/0086600 A1 | 4/2011 | Muhammad et al. |
| 2011/0086630 A1 | 4/2011 | Manssen |
| 2011/0102290 A1 | 5/2011 | Milosavljevic |
| 2011/0105023 A1 | 5/2011 | Scheer et al. |
| 2011/0116395 A1 | 5/2011 | Tsuda et al. |
| 2011/0116423 A1 | 5/2011 | Rousu et al. |
| 2011/0117863 A1 | 5/2011 | Camp, Jr. et al. |
| 2011/0117973 A1 | 5/2011 | Asrani et al. |
| 2011/0121079 A1 | 5/2011 | Lawrence et al. |
| 2011/0122040 A1 | 5/2011 | Wakabayashi et al. |
| 2011/0133994 A1 | 6/2011 | Korva |
| 2011/0140982 A1 | 6/2011 | Ozden et al. |
| 2011/0156812 A1 | 6/2011 | Parkhurst et al. |
| 2011/0183628 A1 | 7/2011 | Baker |
| 2011/0183633 A1 | 7/2011 | Ohba et al. |
| 2011/0195679 A1 | 8/2011 | Lee et al. |
| 2011/0227666 A1 | 9/2011 | Manssen |
| 2011/0237207 A1 | 9/2011 | Bauder |
| 2011/0249760 A1 | 10/2011 | Chrisikos et al. |
| 2011/0250852 A1 | 10/2011 | Greene |
| 2011/0254637 A1 | 10/2011 | Manssen |
| 2011/0254638 A1 | 10/2011 | Manssen |
| 2011/0256857 A1 | 10/2011 | Chen et al. |
| 2011/0281532 A1 | 11/2011 | Shin et al. |
| 2011/0285511 A1 | 11/2011 | Maguire et al. |
| 2011/0299438 A1 | 12/2011 | Mikhemar et al. |
| 2011/0304408 A1 | 12/2011 | McKinzie et al. |
| 2011/0306310 A1 | 12/2011 | Bai |
| 2011/0309980 A1 | 12/2011 | Ali et al. |
| 2012/0039189 A1 | 2/2012 | Suzuki et al. |
| 2012/0051409 A1 | 3/2012 | Brobston et al. |
| 2012/0062431 A1 | 3/2012 | Tikka et al. |
| 2012/0075159 A1 | 3/2012 | Chang et al. |
| 2012/0084537 A1 | 4/2012 | Indukuru et al. |
| 2012/0094708 A1 | 4/2012 | Park et al. |
| 2012/0099462 A1 | 4/2012 | Yuda et al. |
| 2012/0100802 A1 | 4/2012 | Mohebbi |
| 2012/0112851 A1 | 5/2012 | Manssen |
| 2012/0112970 A1 | 5/2012 | Mow et al. |
| 2012/0119843 A1 | 5/2012 | du Toit et al. |
| 2012/0119844 A1 | 5/2012 | du Toit et al. |
| 2012/0139810 A1 | 6/2012 | Faraone et al. |
| 2012/0154975 A1 | 6/2012 | Oakes |
| 2012/0214421 A1 | 8/2012 | Hoirup et al. |
| 2012/0220243 A1 | 8/2012 | Mendolia |
| 2012/0243579 A1 | 9/2012 | Premakanthan et al. |
| 2012/0286586 A1 | 11/2012 | Balm |
| 2012/0293384 A1 | 11/2012 | Knudsen et al. |
| 2012/0295554 A1 | 11/2012 | Greene et al. |
| 2012/0295555 A1 | 11/2012 | Greene et al. |
| 2012/0309332 A1 | 12/2012 | Liao et al. |
| 2013/0005277 A1 | 1/2013 | Klomsdorf et al. |
| 2013/0052967 A1 | 2/2013 | Black et al. |
| 2013/0056841 A1 | 3/2013 | Hsieh et al. |
| 2013/0076579 A1 | 3/2013 | Zhang et al. |
| 2013/0076580 A1 | 3/2013 | Zhang et al. |
| 2013/0106332 A1 | 5/2013 | Williams et al. |
| 2013/0122829 A1 | 5/2013 | Hyvonen et al. |
| 2013/0137384 A1 | 5/2013 | Desclos et al. |
| 2013/0154897 A1 | 6/2013 | Sorensen et al. |
| 2013/0182583 A1 | 7/2013 | Siomina et al. |
| 2013/0194054 A1 | 8/2013 | Presti |
| 2013/0215846 A1 | 8/2013 | Yerrabommanahalli et al. |
| 2013/0231155 A1 | 9/2013 | Sheynman et al. |
| 2013/0265912 A1 | 10/2013 | Ikonen et al. |
| 2013/0293425 A1 | 11/2013 | Zhu et al. |
| 2013/0315285 A1 | 11/2013 | Black et al. |
| 2014/0002323 A1 | 1/2014 | Ali et al. |
| 2014/0009360 A1 | 1/2014 | Ikonen et al. |
| 2014/0128032 A1 | 5/2014 | Muthukumar et al. |
| 2014/0162572 A1 | 6/2014 | Hirabayashi |
| 2014/0210686 A1 | 7/2014 | Ali et al. |
| 2014/0287698 A1 | 9/2014 | Ali et al. |
| 2014/0366927 A1 | 12/2014 | Lavrova et al. |
| 2016/0173172 A1 | 6/2016 | Greene |
| 2016/0241276 A1 | 8/2016 | Zhu |
| 2016/0269055 A1 | 9/2016 | Greene et al. |
| 2016/0322991 A1 | 11/2016 | McKinzie |
| 2016/0336916 A1 | 11/2016 | Du Toit et al. |
| 2016/0352408 A1 | 12/2016 | Greene |
| 2016/0373146 A1 | 12/2016 | Manssen et al. |
| 2017/0011858 A1 | 1/2017 | Oakes et al. |
| 2017/0085244 A1 | 3/2017 | Manssen et al. |
| 2017/0197180 A1 | 7/2017 | Wei |
| 2017/0264322 A1 | 9/2017 | Greene et al. |
| 2017/0264335 A1 | 9/2017 | Hoirup et al. |
| 2017/0294712 A1 | 10/2017 | Greene |
| 2017/0294891 A1 | 10/2017 | McKinzie, III |
| 2017/0373661 A1 | 12/2017 | Manssen et al. |
| 2018/0109235 A1 | 4/2018 | McKinzie et al. |
| 2018/0198482 A1 | 7/2018 | Hoirup et al. |
| 2019/0207580 A1 | 7/2019 | Manssen |
| 2019/0341947 A1 | 11/2019 | Greene et al. |

FOREIGN PATENT DOCUMENTS

| | | |
|---|---|---|
| CN | 201765685 U | 3/2011 |
| CN | 105703797 | 6/2016 |

(56) References Cited

FOREIGN PATENT DOCUMENTS

| | | |
|---|---|---|
| DE | 19614655 | 10/1997 |
| DE | 10258805 B4 | 3/2005 |
| DE | 102008050743 | 4/2010 |
| DE | 102009018648 A1 | 10/2010 |
| EP | 0685936 | 6/1995 |
| EP | 0909024 | 4/1999 |
| EP | 1079296 | 2/2001 |
| EP | 1137192 | 9/2001 |
| EP | 1298810 | 4/2006 |
| EP | 20070197180 | 8/2007 |
| EP | 2214085 A2 | 8/2010 |
| EP | 2328233 | 6/2011 |
| EP | 2388925 A1 | 11/2011 |
| EP | 2424119 A1 | 2/2012 |
| EP | 2638640 A4 | 7/2014 |
| EP | 3131157 | 2/2017 |
| JP | 03276901 | 3/1990 |
| JP | 02-077580 | 9/1991 |
| JP | 9321526 | 12/1997 |
| JP | 10209722 | 8/1998 |
| JP | 2000124066 | 4/2000 |
| JP | 2005-130441 | 5/2005 |
| KR | 100645526 | 11/2006 |
| KR | 10-0740177 | 7/2007 |
| WO | 2001/071846 | 9/2001 |
| WO | 2006/031170 | 3/2006 |
| WO | 2008/030165 | 3/2008 |
| WO | 2009/064968 | 5/2009 |
| WO | 2009/108391 A1 | 9/2009 |
| WO | 2009/155966 | 12/2009 |
| WO | 2009155966 A1 | 12/2009 |
| WO | 2010028521 A1 | 3/2010 |
| WO | 2010121914 A1 | 10/2010 |
| WO | 2011/044592 | 4/2011 |
| WO | 2011084716 A1 | 7/2011 |
| WO | 2011102131 A1 | 8/2011 |
| WO | 2011/133657 | 10/2011 |
| WO | 2011028453 | 10/2011 |
| WO | 2012/067622 | 5/2012 |
| WO | 2012067622 A1 | 5/2012 |
| WO | 2012085932 A2 | 6/2012 |
| WO | 2012112831 A1 | 8/2012 |

OTHER PUBLICATIONS

Office Action dated Nov. 7, 2018, Canadian Patent Application 2,826,573, 4 pages.
Nowrouzian, B., "A necessary and sufficient condition for the BIBO stability of general-order bode-type variable-amplitude wave-digital equalizers," ICME '03. Proc., USA, 2003, pp. 373-376. (Year: 2003).
Communication pursuant to Article 94(3) EPC issued by the European Patent Office, dated Nov. 16, 2017; European Patent Application 12177197.6.
Canadian Office Action, Application No. 2,821,173, dated Oct. 17, 2016.
Extended European Search Report for 12749235.3 dated Jun. 8, 2017.
Communication pursuant to Article 94(3) EPC, Application No. 10822849.5, dated Oct. 11, 2017, 5 pages.
"European Search Report", 16151299.1 search report, dated 2016.
"Extended European Search Report", EP Application No. 16155235. 1, dated May 3, 2016.
"Office Action Received in China Patent Application 201080045689. X", dated Mar. 4, 2016, 6 pages.
"Search Report", ROC (Taiwan) Patent Application No. 101117467, English Translation, dated Apr. 12, 2016, 1 page.
Bezooijen, A. et al., "A GSM/EDGE/WCDMA Adaptive Series-LC Matching Network Using RF-MEMS Switches", IEEE Journal of Solid-State Circuits, vol. 43, No. 10, Oct. 2008, 2259-2268.
Canadian IPO, "Office Action dated Mar. 10, 2017", dated Mar. 10, 2017, 1-3.

Eiji, N., "High-Frequency Circuit and Its Manufacture", Patent Abstracts of Japan, vol. 1998, No. 13, Nov. 30, 1998 & JP 10 209722 A (Seiko Epson Corp), Aug. 7, 1998.
EPO, "Extended European Search Report, EP16188956.3," Jan. 9, 2017, 1-9.
Huang, Libo et al., "Theoretical and experimental investigation of adaptive antenna impedance matching for multiband mobile phone applications", IEEE, Sep. 7, 2005, 13-17.
Hyun, S., "Effects of strain on the dielectric properties of tunable dielectric SrTiO3 thin films", Applied Physics Letters, vol. 79, No. 2, Jul. 9, 2001.
Ida, I. et al., "An Adaptive Impedance Matching System and Its Application to Mobile Antennas", TENCON 2004, IEEE Region 10 Conference, See Abstract ad p. 544, Nov. 21-24, 2004, 543-547.
Katsuya, ., "Hybrid Integrated Circuit Device", Patent Abstracts of Japan, Publication No. 03-276901, Date of publication of application: Sep. 12, 1991.
Manssen, "Method and Apparatus for Managing Interference in a Communication Device", U.S. Appl. No. 61/326,206, filed Apr. 20, 2010.
Paratek Microwave, Inc., "Method and Appartus for Tuning Antennas in a Communication Device", International Application No. PCT/US11/59620; Filed Nov. 7, 2011.
Patent Cooperation Treaty, "International Search Report and Written Opinion", International Application No. PCT/US2010/046241, dated Mar. 2, 2011.
Patent Cooperation Treaty, "International Search Report and Written Opinion", International Application No. PCT/US2010/056413, dated Jul. 27, 2011.
Patent Cooperation Treaty, "International Search Report and Written Opinion", dated Nov. 16, 2011, International Application No. PCT/US/2011/038543.
Patent Cooperation Treaty, "International Search Report and Written Opinion", PCT Application No. PCT/US08/005085, dated Jul. 2, 2008.
Payandehjoo, Kasra et al., "Investigation of Parasitic Elements for Coupling Reduction in MultiAntenna Hand-Set Devices", Published online Jan. 22, 2013 in Wiley Online Library (wileyonlinelibrary. com).
Pervez, N.K., "High Tunability barium strontium titanate thin films for RF circuit applications", Applied Physics Letters, vol. 85, No. 19, Nov. 8, 2004.
Petit, Laurent, "MEMS-Switched Parasitic-Antenna Array for Radiation Pattern Diversity", IEEE Transactions on Antennas and Propagation, vol. 54, No. 9, Sep. 2009, 2624-2631.
Qiao, et al., "Antenna Impedance Mismatch Measurement and Correction for Adaptive COMA Transceivers", IEEE, Jan. 2005.
Qiao, et al., "Measurement of Antenna Load Impedance for Power Amplifiers", The Department of Electrical and Computer Engineering, University of California, San Diego, Sep. 13, 2004.
Stemmer, Susanne, "Low-loss tunable capacitors fabricated directly on gold bottom electrodes", Applied Physics Letters 88, 112905, Mar. 15, 2006.
Taylor, T.R., "Impact of thermal strain on the dielectric constant of sputtered barium strontium titanate thin films", Applied Physics Letters, vol. 80, No. 11, Mar. 18, 2002.
Tombak, Ali, "Tunable Barium Strontium Titanate Thin Film Capacitors for RF and Microwave Applications", IEEE Microwave and Wireles Components Letters, vol. 12, Jan. 2002.
Xu, Hongtao, "Tunable Microwave Integrated Circuits using BST Thin Film Capacitors with Device", Integrated Ferroelectrics, Department of Electrical Engineering and Computer Engineering, University of California, 2005, Apr. 2005.
Zuo, S., "Eigenmode Decoupling for Mimo Loop-Antenna Based on 180 Coupler", Progress in Electromagnetics Research Letters, vol. 26, Aug. 2011, 11-20.
Communication pursuant to Article 94(3) EPC, EPO application No. 16151299.1, dated Jun. 22, 2018.
India, Patent O., "Examination Report", for Application No. 9844/DELNP/2013, Apr. 25, 2018, 5 pages.
Intellectual Property India, "First Examination Report", for Application No. 3160/CHE/2013 dated Jun. 5, 2018, Jun. 5, 2018, 5 pages.

(56) References Cited

OTHER PUBLICATIONS

European Patent Office, "EP Office Action dated Feb. 28, 2019", for EP Application 11772625.7, dated Feb. 28, 2019, 11 pages.
3317/DELNP/2012, first examination report, dated Mar. 22, 2019, 6 pages.

* cited by examiner

900

1000

LOOK-UP TABLE

| |
|---|
| Band 1; Use Case 1; Desired tuning state |
| Band 1; Use Case 2; Desired tuning state |
| ⋮ |
| Band 1; Use Case n; Desired tuning state |
| Band 2; Use Case 1; Desired tuning state |
| Band 2; Use Case 2; Desired tuning state |
| ⋮ |
| Band 2; Use Case n; Desired tuning state |
| Band N; Use Case 1; Desired tuning state |
| Band N; Use Case 2; Desired tuning state |
| ⋮ |
| Band N; Use Case n; Desired tuning state |

METHOD AND APPARATUS FOR MANAGING OPERATIONS OF A COMMUNICATION DEVICE

CROSS-REFERENCE TO RELATED APPLICATIONS

This application is a divisional of U.S. patent application Ser. No. 14/684,701, filed Apr. 13, 2015, which is a continuation of U.S. patent application Ser. No. 12/577,178 filed Oct. 10, 2009, now U.S. Pat. No. 9,026,062. The contents of each of the foregoing are hereby incorporated by reference into this application as if set forth herein in full.

FIELD OF THE DISCLOSURE

The present disclosure relates generally to communication device operations, and more specifically to a method and apparatus for managing operations of a communication device.

BACKGROUND

The quality of wireless communications between wireless access points such as Wireless Fidelity (WiFi) or cellular base stations and portable mobile devices such as cell phones and laptop computers can depend on many factors. For example, an antenna's performance in a portable device can be impacted by its operating environment. Multiple use cases can exist for radio handsets, which include such conditions as the placement of the handset's antenna next to a user's head, or in the user's pocket or the covering of an antenna with a hand, which can significantly impair wireless device efficiency. Similarly, the quality of wireless communications can be affected by network topology and location of the mobile device.

BRIEF DESCRIPTION OF THE DRAWINGS

FIG. 13 depicts an illustrative embodiment of a look-up table utilized by the communication device for controlling the matching network of the transceiver of FIG. 2;

DETAILED DESCRIPTION

One embodiment of the present disclosure entails a computer-readable storage medium having computer instructions to establish a communication session with a communication system, identify the communication system from the communication session, select a profile according to the identified communication system, and provision one or more tuning states of a matching network having a tunable reactance according to provisioning information included in the profile, wherein the one or more tuning states of the matching network affects one or more performance parameters of the communication device.

One embodiment of the present disclosure entails a matching network having a tunable reactance circuit coupled to one of a transmitter portion and a receiver portion of a communication device. The tunable reactance circuit can affect one or more performance parameters of the communication device. The tunable reactance circuit can further be provisioned by the communication device according to a profile that describes communication characteristics of a communication system from which the communication device operates.

One embodiment of the present disclosure entails a cellular base station having a controller to transmit a request to a communication device to utilize a profile for provisioning a tunable reactance circuit that affects one or more performance parameters of the communication device.

One embodiment of the present disclosure entails a communication device having a controller to provision a matching network that controls one or more operational characteristics of one of a receiver portion and a transmitter portion of the communication device according to a profile describing one or more characteristics of a communication system from which the communication device operates.

One embodiment of the present disclosure entails a method to tune a tunable reactance circuit in a communication device according to a profile that controls operations of the communication device according to at least one of a transmit power level of a transmitter portion of the communication device and a receive signal strength of a receiver portion of the communication device.

Figure 1:
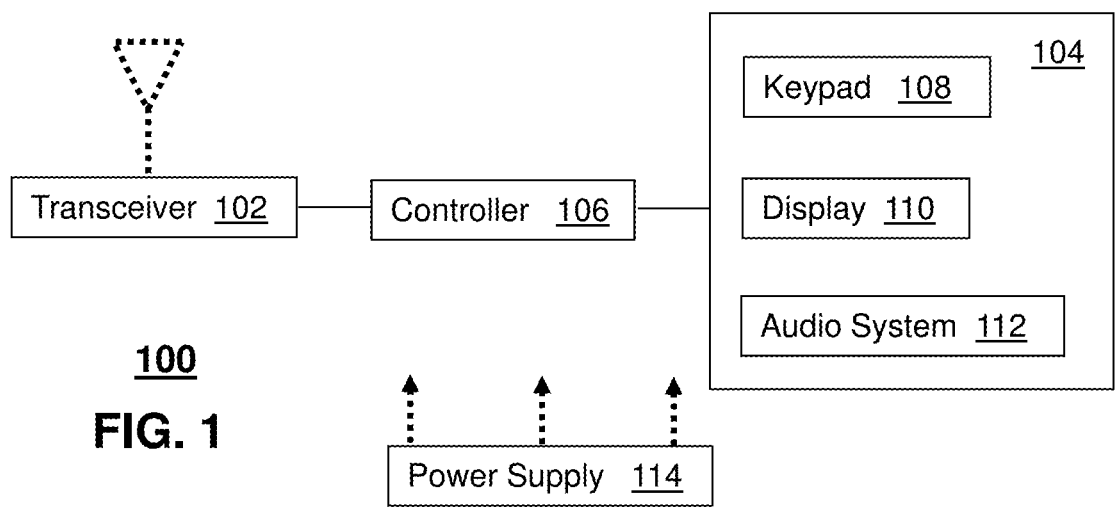
FIG. 1 depicts an illustrative embodiment of a communication device.

FIG. 1 depicts an exemplary embodiment of a communication device 100. The communication device 100 can comprise a wireless transceiver 102 (herein having independent transmit and receiver sections, a user interface (UI) 104, a power supply 114, and a controller 106 for managing operations thereof. The wireless transceiver 102 can utilize short-range or long-range wireless access technologies such as Bluetooth, WiFi, Digital Enhanced Cordless Telecommunications (DECT), or cellular communication technologies, just to mention a few. Cellular technologies can include, for example, CDMA-1x, WCDMA, UMTS/HSDPA, GSM/GPRS, TDMA/EDGE, EV/DO, WiMAX, and next generation cellular wireless communication technologies as they arise.

The UI 104 can include a depressible or touch-sensitive keypad 108 with a navigation mechanism such as a roller ball, joystick, mouse, or navigation disk for manipulating operations of the communication device 100. The keypad 108 can be an integral part of a housing assembly of the communication device 100 or an independent device operably coupled thereto by a tethered wireline interface (such as a flex cable) or a wireless interface supporting for example Bluetooth. The keypad 108 can represent a numeric dialing keypad commonly used by phones, and/or a Qwerty keypad with alphanumeric keys. The UI 104 can further include a display 110 such as monochrome or color LCD (Liquid Crystal Display), OLED (Organic Light Emitting Diode) or other suitable display technology for conveying images to an end user of the communication device 100. In an embodiment where the display 110 is a touch-sensitive display, a portion or all of the keypad 108 can be presented by way of the display.

The power supply 114 can utilize common power management technologies (such as replaceable batteries, supply regulation technologies, and charging system technologies) for supplying energy to the components of the communication device 100 to facilitate portable applications. The controller 106 can utilize computing technologies such as a microprocessor and/or digital signal processor (DSP) with associated storage memory such a Flash, ROM, RAM, SRAM, DRAM or other like technologies.

Figure 2:
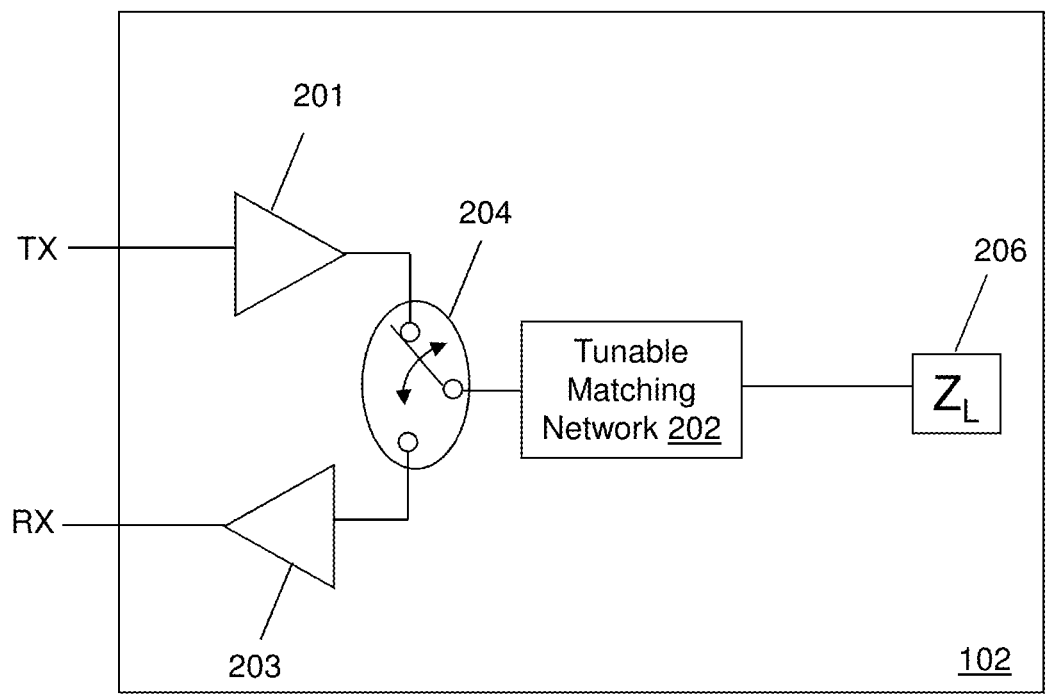
FIG. 2 depicts an illustrative embodiment of a portion of a transceiver of the communication device of FIG. 1.

FIG. 2 depicts an illustrative embodiment of a portion of the wireless transceiver 102 of the communication device 100 of FIG. 1. In GSM applications, the transmit and receive portions of the transceiver 102 can include common amplifiers 201, 203 coupled to a tunable matching network 202 and an impedance load 206 by way of a switch 204. The load 206 in the present illustration can an antenna as shown in FIG. 1 (herein antenna 206). A transmit signal in the form of a radio frequency (RF) signal (TX) can be directed to the amplifier 201 which amplifies the signal and directs the amplified signal to the antenna 206 by way of the tunable matching network 202 when switch 204 is enabled for a transmission session. The receive portion of the transceiver 102 can utilize a pre-amplifier 203 which amplifies signals received from the antenna 206 by way of the tunable matching network 202 when switch 204 is enabled for a receive session. Other configurations of FIG. 2 are possible for other types of cellular access technologies such as CDMA. These undisclosed configurations are contemplated by the present disclosure.

Figure 3:
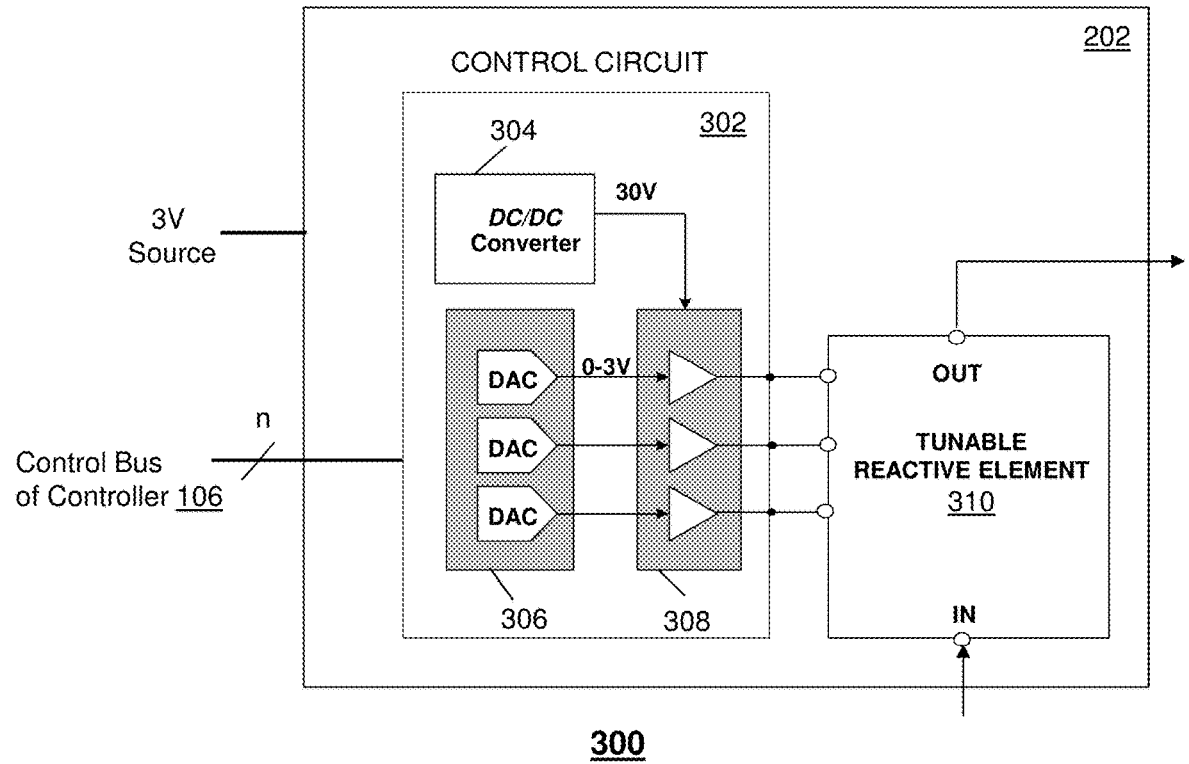
FIGS. 3-4 depict illustrative embodiments of a tunable matching network of the transceiver of FIG. 2.
Figure 4:
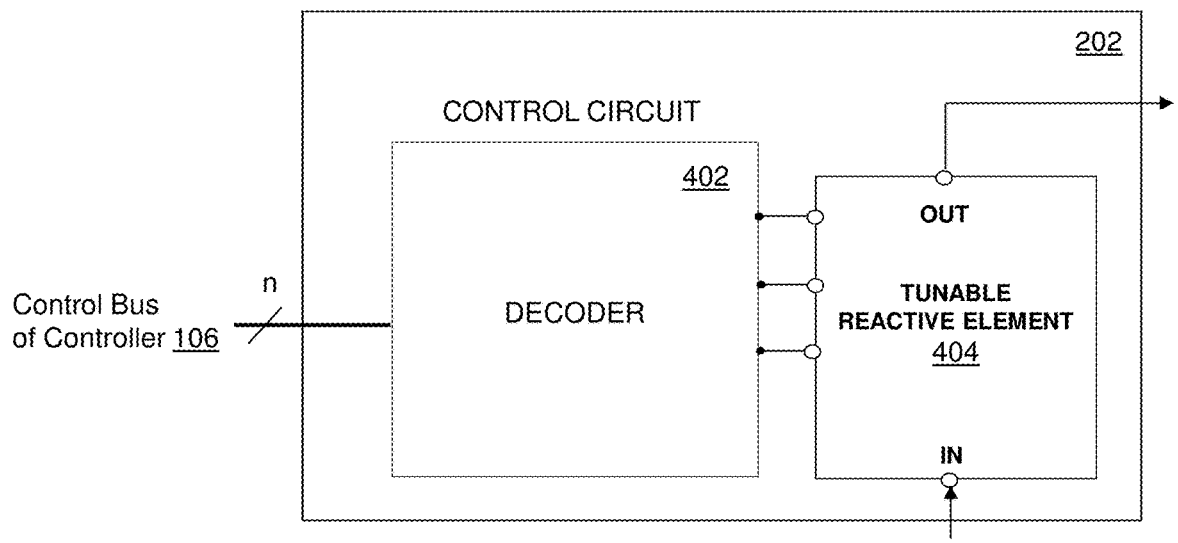
Figure 5:
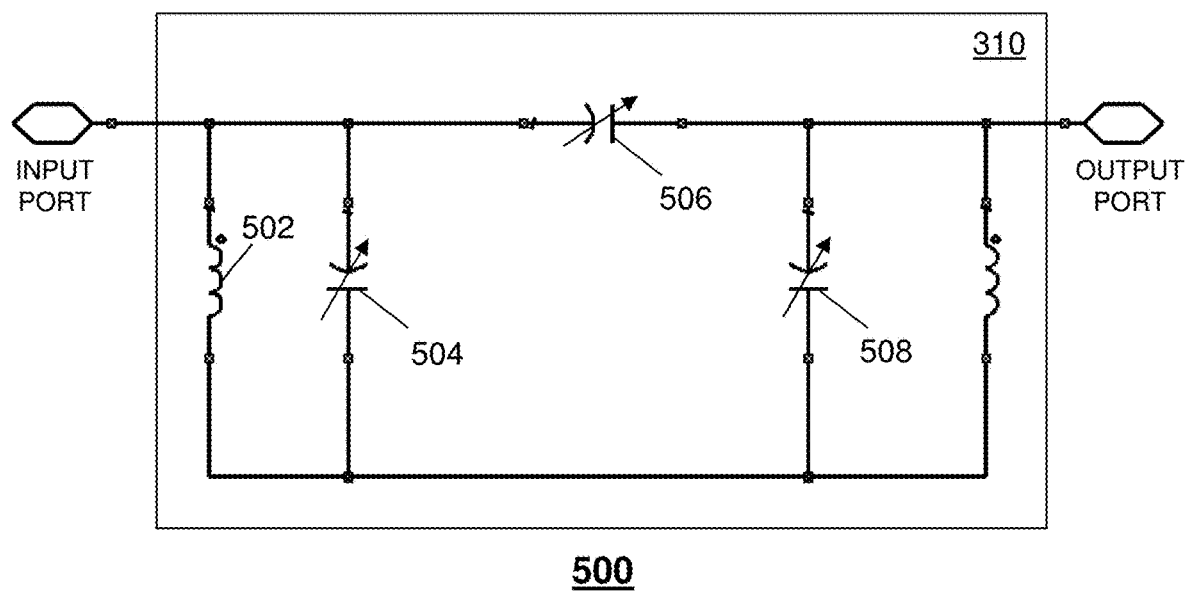
FIGS. 5-6 depict illustrative embodiments of a tunable reactive element of the tunable matching network.

FIGS. 3-4 depict illustrative embodiments of the tunable matching network 202 of the transceiver 102 of FIG. 2. In one embodiment, the tunable matching network 202 can comprise a control circuit 302 and a tunable reactive element 310. The control circuit 302 can comprise a DC-to-DC converter 304, one or more digital to analog converters (DACs) 306 and one or more corresponding buffers 308 to amplify the voltage generated by each DAC. The amplified signal can be fed to one or more tunable reactive components 504, 506 and 508 such as shown in FIG. 5, which depicts a possible circuit configuration for the tunable reactive element 310. In this illustration, the tunable reactive element 310 includes three tunable capacitors 504-508 and an inductor 502 with a fixed inductance. Other circuit configurations are possible, and thereby contemplated by the present disclosure.

The tunable capacitors 504-508 can each utilize technology that enables tunability of the capacitance of said component. One embodiment of the tunable capacitors 504-508 can utilize voltage or current tunable dielectric materials such as a composition of barium strontium titanate (BST). An illustration of a BST composition is the Parascan® Tunable Capacitor. In another embodiment, the tunable reactive element 310 can utilize semiconductor varactors. Other present or next generation methods or material compositions that can support a means for a voltage or current tunable reactive element are contemplated by the present disclosure.

The DC-to-DC converter 304 can receive a power signal such as 3 Volts from the power supply 114 of the communication device 100 in FIG. 1. The DC-to-DC converter 304 can use common technology to amplify this power signal to a higher range (e.g., 30 Volts) such as shown. The controller 106 can supply digital signals to each of the DACs 306 by way of a control bus of "n" or more wires to individually control the capacitance of tunable capacitors 504-508, thereby varying the collective reactance of the tunable matching network 202. The control bus can be implemented with a two-wire common serial communications technology such as a Serial Peripheral Interface (SPI) bus. With an SPI bus, the controller 106 can submit serialized digital signals to configure each DAC in FIG. 3 or the switches of the tunable reactive element 404 of FIG. 4. The control circuit 302 of FIG. 3 can utilize common digital logic to implement the SPI bus and to direct digital signals supplied by the controller 106 to the DACs.

Figure 6:
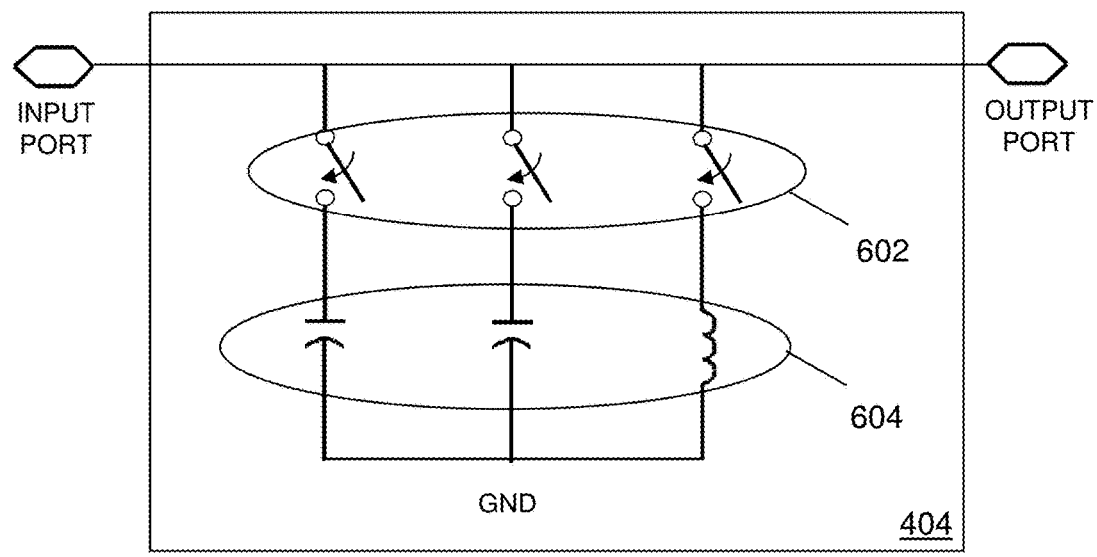

In another embodiment, the tunable matching network 202 can comprise a control circuit 402 in the form of a decoder and a tunable reactive element 404 comprising switchable reactive elements such as shown in FIG. 6. In this embodiment, the controller 106 can supply the control circuit 402 signals via the SPI bus which can be decoded with common Boolean or state machine logic to individually enable or disable the switching elements 602. The switching elements 602 can be implemented with semiconductor switches or micro-machined switches such as utilized in micro-electromechanical systems (MEMS). By independently enabling and disabling the reactive elements (capacitor or inductor) of FIG. 6 with the switching elements 602, the collective reactance of the tunable reactive element 404 can be varied.

Figure 7:
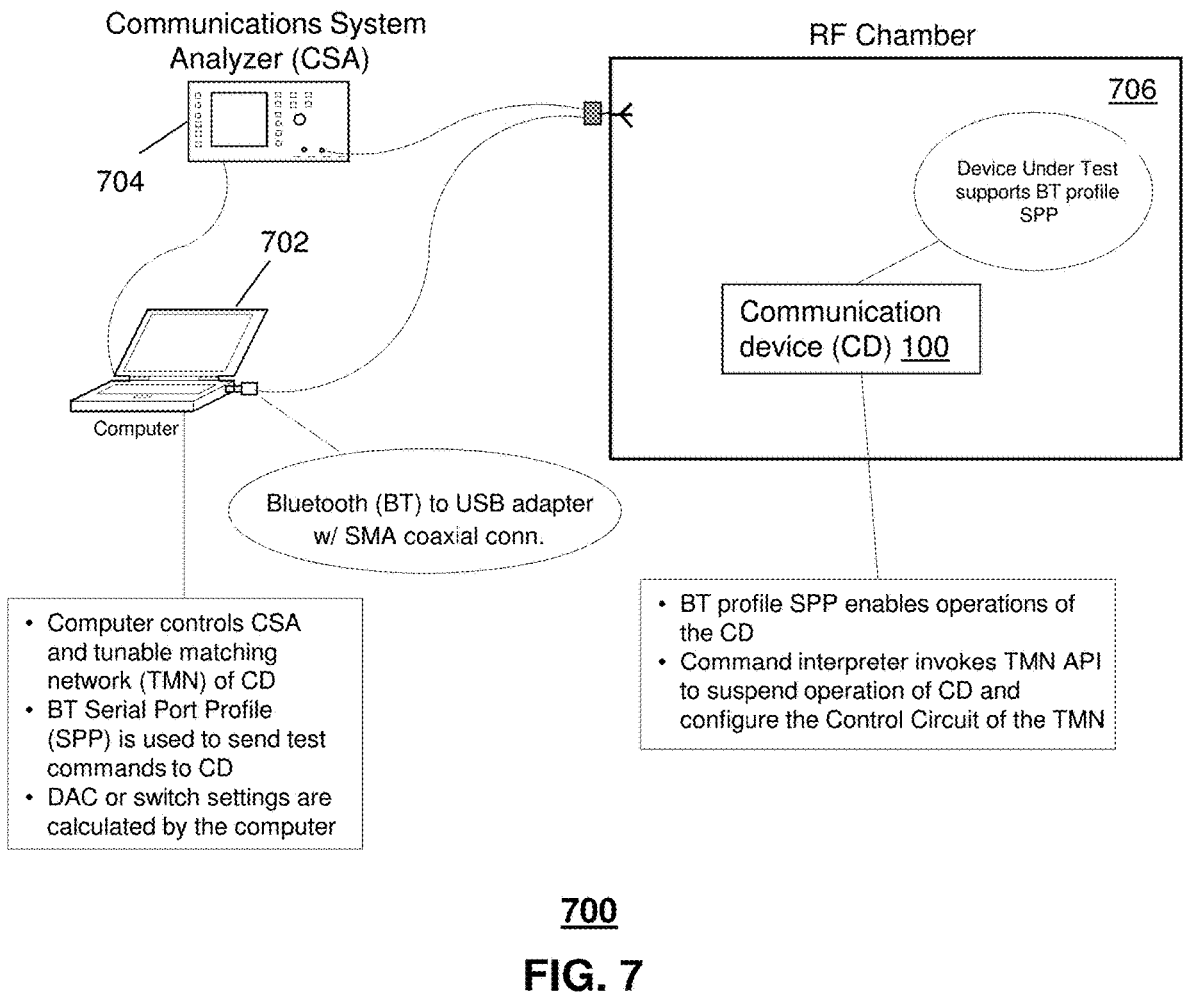
FIG. 7 depicts an illustrative embodiment of a test environment for configuring the communication device of FIG. 1.

The tunability of the tunable matching networks 202, 204 provides the controller 106 a means to optimize performance parameters of the transceiver 102 such as, for example, but not limited to, transmitter power, transmitter efficiency, receiver sensitivity, power consumption of the communication device, a specific absorption rate (SAR) of energy by a human body, frequency band performance parameters, and so on. To achieve one or more desirable performance characteristics which a designer can define, the communication device 100 can be placed in an anechoic chamber 706 such as depicted by FIG. 7. In this configuration, the designer can perform calibration measurements of performance parameters of the communication device 100 such as Total Radiated Power (TRP), Total Isotropic Sensitivity (TIS) or Radiated Harmonics measurements, receiver efficiency, transmit power efficiency, and power consumption, just to mention a few. For a multi-frequency band communication device 100, the calibration measurements can be performed per band or per sub-band.

Additionally, the calibration measurements can be performed under a number of use cases of the communication device 100 utilizing a phantom body that emulates the composition of a human body. For instance, a communication device 100 having a housing assembly of a flip design, the communication device 100 can be placed next to an ear of the phantom when the flip is open to emulate a typical conversational use case. In a hands-free application such when a user utilizes a Bluetooth headset or when the communication device 100 is in standby mode, the communication device 100 can be placed on a hip of the phantom with the flip closed. Calibration can be performed on other use cases such as antenna up, or down, speakerphone feature "ON" with communication device 100 held with a phantom hand but away from the phantom head. Any number of use cases can be applied to each frequency band and sub-band if desirable.

As depicted in FIG. 7, a computer 702 can be communicatively coupled to the communication device 100 located in the anechoic chamber by way of a Bluetooth to USB adapter with coaxial connection. The computer 702 can also be communicatively coupled to a communications system analyzer 704 (which can place and receive active "phone calls" to a cellular handset) which is also connected to the anechoic chamber by way of coaxial cable connection. The computer 702 can control the communications system analyzer 704 and the tunable matching network 202 of FIG. 2. Control of the communication device 100 can conform to a Bluetooth Serial Port Profile (SPP) which provides the computer 702 a means to send test commands, control DAC settings, or switch settings by way of control circuits 302 or 402 of FIG. 3 or 4. Although not shown, the calibration environment of FIG. 7 can include additional test equipment that can measure power consumption of the communication device 100, SAR, harmonics or other useful performance parameters. Accordingly, any measurable performance parameter of the communication device 100 is contemplated by the present disclosure.

Figure 8:
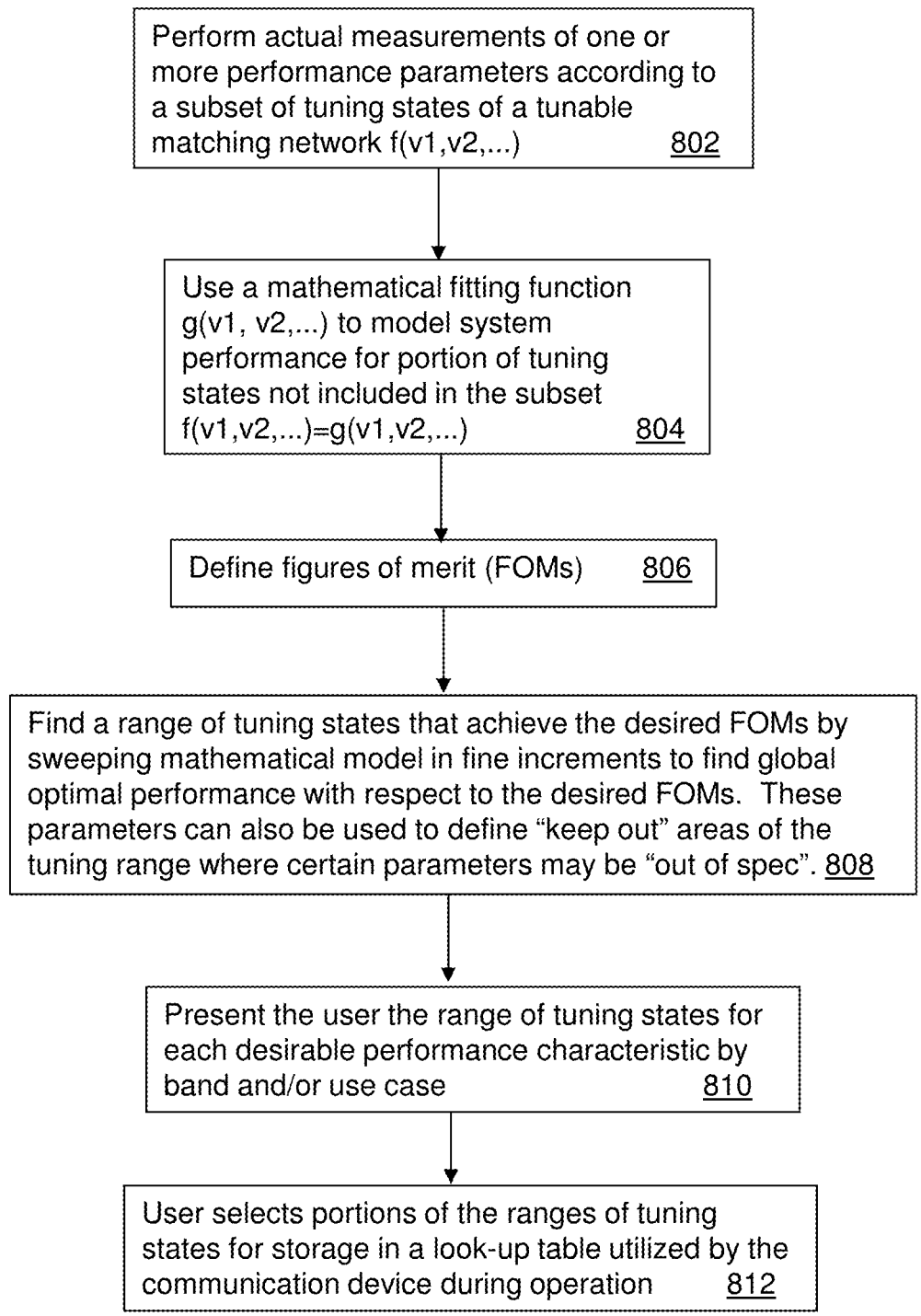
FIG. 8 depicts an exemplary method operating in portions of the test environment of FIG. 7.

FIG. 8 depicts an exemplary method 800 operating in portions of the test environment of FIG. 7. Method 800 can begin with the computer 702 directing the operations of the communication device 100 and the configuration of the tunable matching network 202 to perform actual measurements of one or more performance parameters (e.g., TX power, RX sensitivity via received signal strength indication or RSSI, power consumption, and so on) of the communication device 100. Suppose for instance that tunable matching network 202 includes three DACs each having thirty-two configurable output voltages ranging from 0 to 3 Volts as shown in FIG. 3. Three DACs would provide 32,768 (32*32*32) combination of voltages which can Be supplied to the three tunable capacitors 504-508 of FIG. 5. Assume further that the transceiver 102 supports 4 bands for world travel, and the designer of the communication device 100 would like to test 3 use cases per band. Under these conditions, the designer would have to perform 393,216 calibration measurements for each performance parameter of interest, which could lead to millions of measurements.

Step 802, however, can be adapted to perform a subset of the possible tuning states of the DACs 306. For example, the computer 702 can be adapted to perform calibration measurements for five tuning states of each DAC. Under these constraints, the calibration measurements can be limited to 125 (5*5*5) calibration measurements for each performance parameter of interest. If one includes 4 bands and 3 use cases, then the total calibration measurements can amount to 1500 measurements, which is obviously substantially less than a full sweep of calibration measurements.

Figure 9:
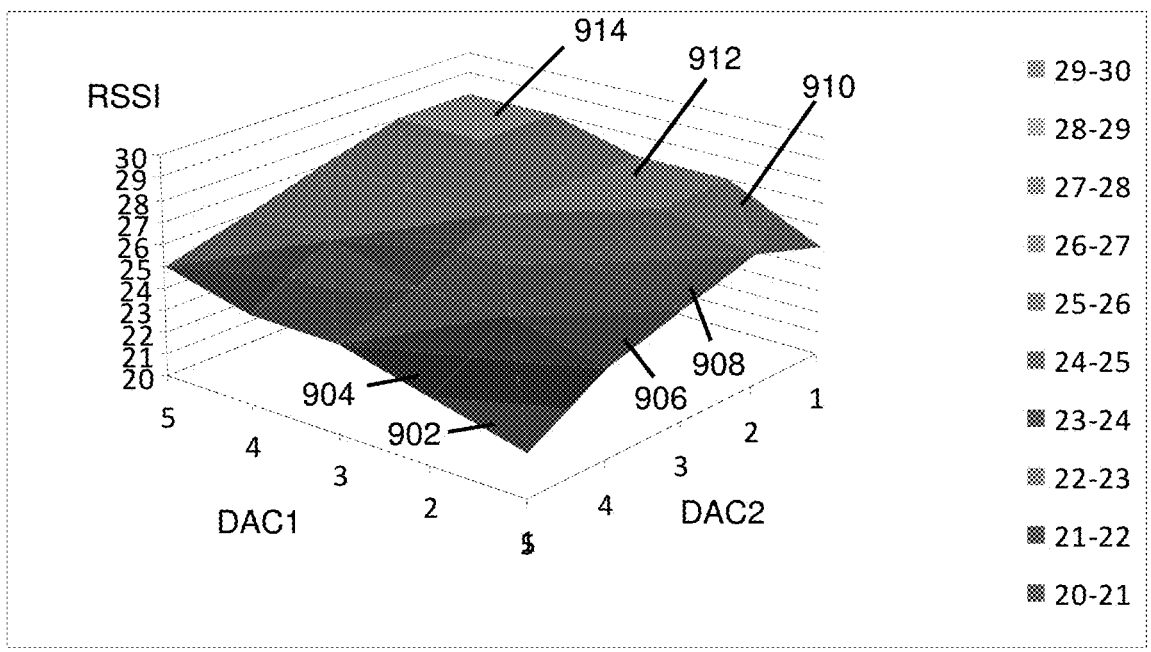
FIGS. 9-12 depict illustrative embodiments of data sets before and after an application of a smoothing function.

For illustration purposes only, the tuning matching network 202 as depicted in FIG. 3 will be assumed to have only two DACs, each capable of 20 tunable levels. It is further assumed that a subset of 5 tuning states is used for step 802. With this in mind, FIG. 9 depicts a data set of 25 calibration measurements of receive sensitivity data based on RSSI measurements. The graph of FIG. 9 illustrates 1 dB contour bands. As should be evident from FIG. 9, contour bands 902-914 are not smooth. The jagged bands occur for two reasons. First, the RSSI data points are inaccurate because the communication device 100 can only provide non-fractional RSSI data. Second, the missing tuning states create a step effect which creates additional jagged edges between contour bands.

In step 804, the computer 702 can be adapted to apply a common mathematical fitting function g(v1, v2, . . . ) to model system performance for the portion of tuning states not included in the subset of step 802. The fitting function can also reduce inaccuracies in the RSSI data. The fitting function can be a $3^{rd}$ or $4^{th}$ order function that utilizes a common regression algorithm to interpolate between the actual measurements derived from step 802. For illustration purposes, what follows is a sample $3^{rd}$ order fitting function:

$$c1+c2x+c3y+c4x^2+c5y^2+c6xy+c7xy^2+c8x^2y+c9x^3+c10y^3$$

Figure 10:
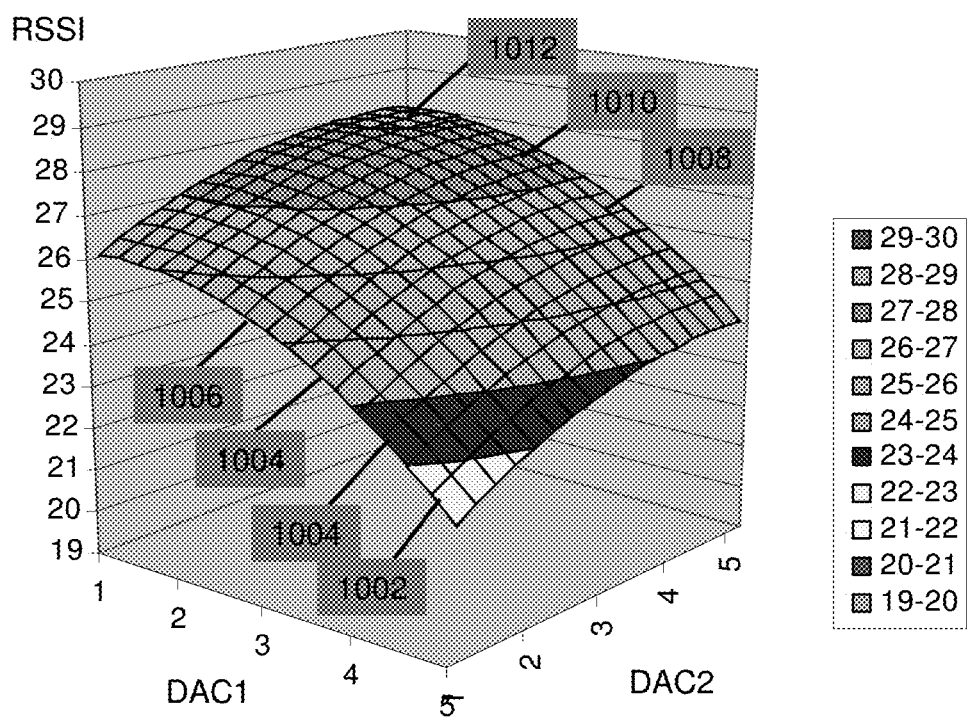

Constants c1-c10 can be adapted through an iterative process to perform a third order fitting function. Other fitting functions are contemplated by the present disclosure. FIG. 10 depicts the result of applying the fitting function to the RSSI data set of FIG. 9. As should be evident from FIG. 10, the 1 dB contour bands 1002-1012 have been substantially smoothed to more accurately reflect the actual RSSI measurements and to estimate the RSSI measurements which would have been measured for the tuning states of the DACs 1 and 2 which were not included in the subset of step 802.

Figure 11:
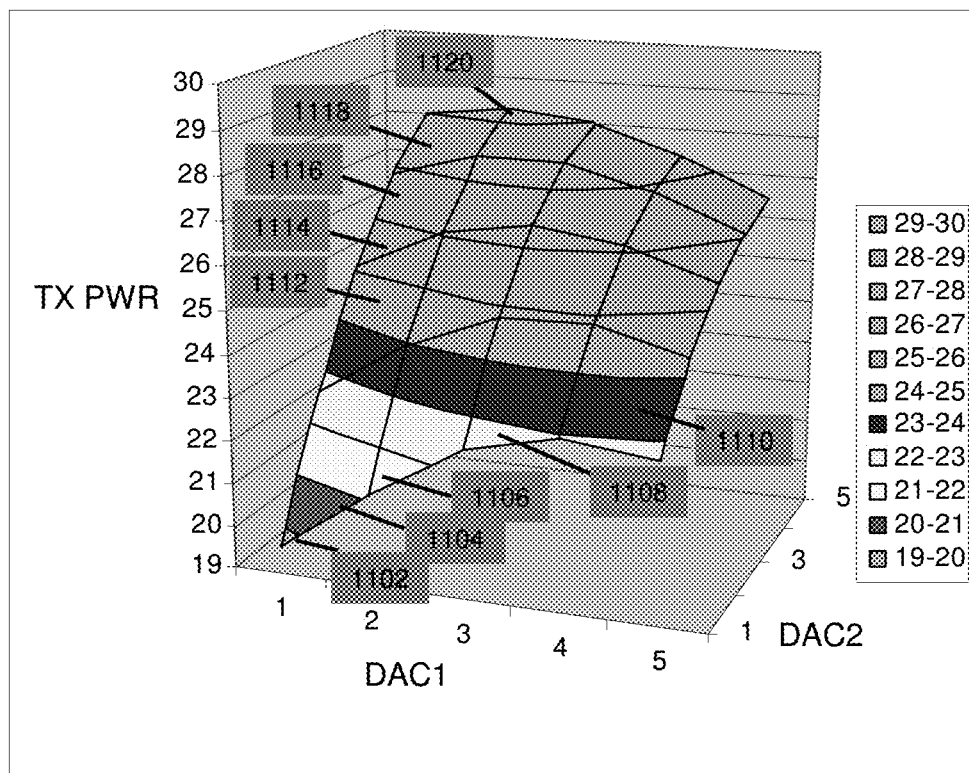
Figure 12:
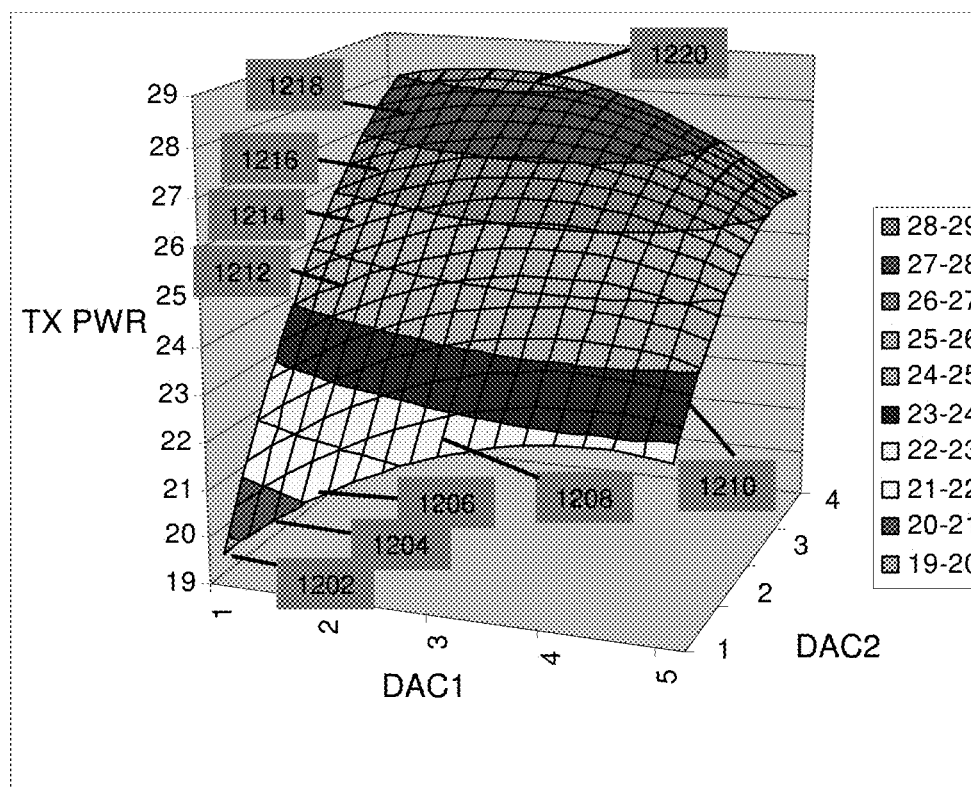

FIG. 11 depicts an illustration of a data set for transmit power measurements performed with the subset of tuning states used in step 802. The 1 dB contour bands 1102-1120 for this illustration are less jagged than the contour bands 902-914 of FIG. 9 because the TX power measurement is derived from the network analyzer which can provide fractional results to the computer 702. FIG. 12 depicts the data set resulting from the application of the above fitting function in step 804. As should be evident in this illustration, the fitting function generates smoother contour bands 1202-1220 when compared to the contour bands 1102-1120 of FIG. 11.

Once the data sets for each performance parameter (e.g., RX sensitivity, TX power, etc.) have been fitted in step 804 over the entire tuning states of DACs 1 and 2, the computer 702 can be adapted with computer software to proceed to step 806 where it can present the designer of the communication device 100 options to define desired figures of merit (FOMs) which can be used to determine tuning states that provide optimal solutions for the desired FOMs. An FOM can represent, for example, a desired power transmit efficiency (TX power over battery power drain). FOMs can also represent "keep out" areas where optimal performance may not be desirable. FOMs can also mathematically combine performance parameters (e.g., TX power+RX power).

Once the designer has defined one or more desirable performance characteristics of the communication device 100 in the form of FOMs, the computer 702 can be adapted in step 808 to find a range of tuning states that achieve the desired FOMs by sweeping with a common mathematical model in fine increments to find global optimal performance with respect to the desired FOMs. The computer 702 can be adapted in step 810 to present the user the range of tuning states that achieve the desired FOMs on a per band and per use case basis. The user can select in step 812 portions of the tuning states for storage in a look-up table which can be utilized by the communication device 100 during operation. FIG. 13 depicts an illustration of a look-up table which can be indexed by the controller 106 of the communication device 100 of FIG. 1 during operation according to band, and use case.

During normal operation by consumers, the communication device 100 can detect a number of possible use cases for the device. For instance, the communication device 100 can detect that the consumer has invoked a call or has answered a called based on the state of call processing software operating in the communication device 100. The call processing software operating in the communication device 100 can also detect which band or sub-band is being used for the active call. The communication device 100 can further detect that a flip housing assembly has been opened with a common electro-mechanical sensor.

The communication device 100 can also detect from the call processing software that a Bluetooth headset feature, and a speakerphone feature are disabled while a communication session is taking place. The communication device 100 can also detect with a common electro-mechanical sensor whether an antenna has been raised or is in the closed position. The communication device 100 can also detect with a proximity sensor and/or an orientation sensor (e.g., an accelerometer) whether the device is near a body part of the user, and whether the device is in a horizontal or vertical position.

There are innumerable detectable use cases that are contemplated by the present disclosure. These detectable states in whole or in part can provide the communication device 100 a means to predict a likelihood of any number of use cases. Once a user case is detected, the communication device 100 can index through the look-up table of FIG. 13 according to the frequency band (or sub-band) and the use case to identify a desirable tuning state of the tunable matching network 202 of FIG. 2 that causes the communication device 100 to operate in a desirable manner contemplated by the designer of said communication device 100.

Figure 14:
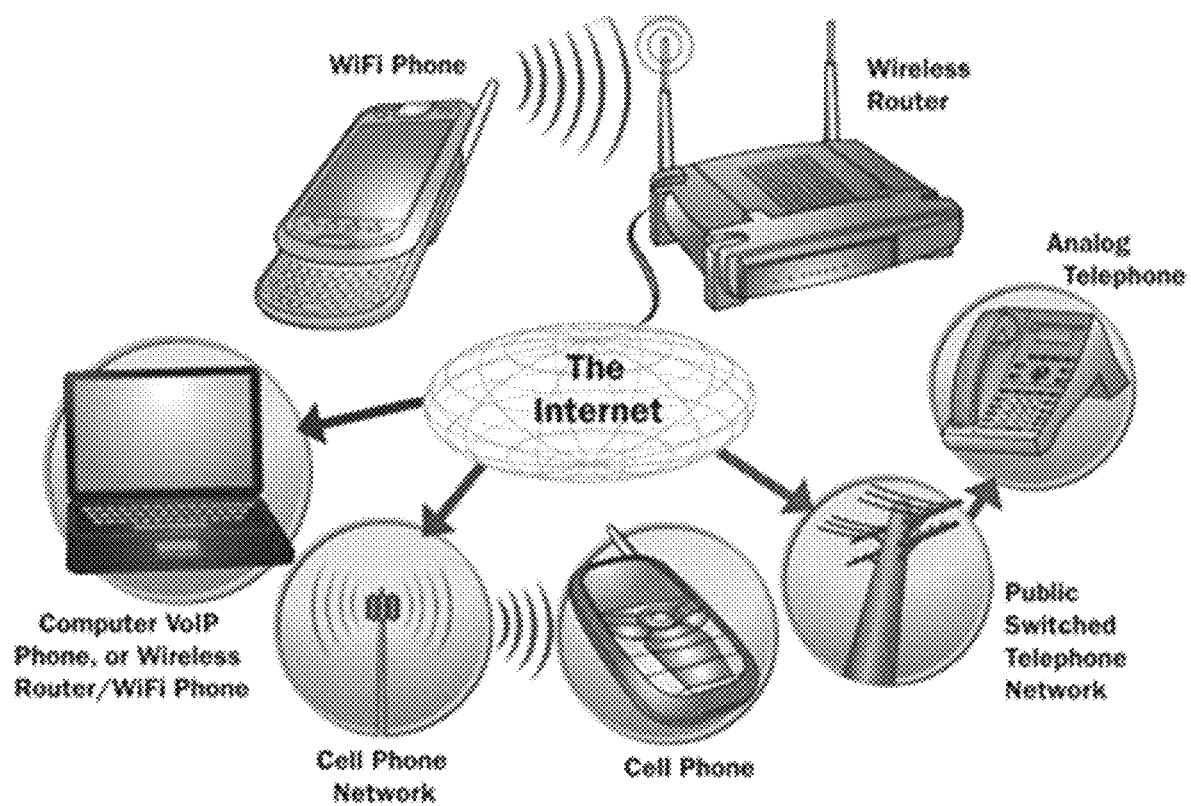
FIG. 14 depicts an illustrative embodiment of a communication system from which the communication device of FIG. 1 can operate.
Figure 15:
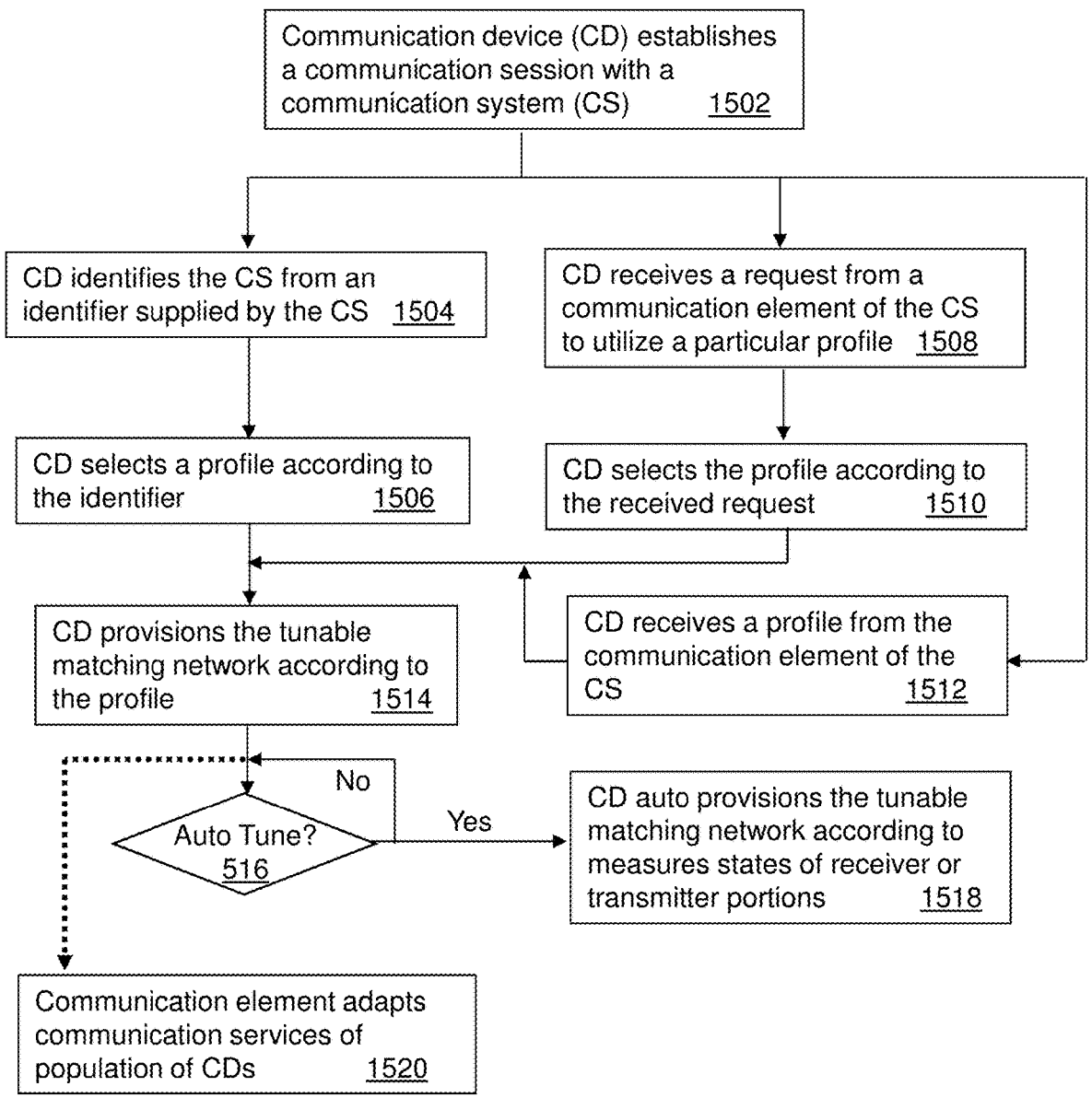
FIG. 15 depicts a method operating in portions of the communication system of FIG. 14.

FIG. 14 depicts a hybrid communication system 1400 supporting WiFi, PSTN, and cellular communications, and Internet services from which the communication device 100 can operate. The communication system 1400 is illustrative and non-limiting. That is, other wired or wireless communication techniques are contemplated by the present disclosure such as Ethernet over power lines, Bluetooth, WiMAX, Software Defined Radio, and so on. FIG. 15 depicts a method 1500 which can be used by the communication device 100 in addition or in combination with the aforementioned embodiments described by method 800.

Method 1500 can begin with step 1502 in which a communication device 100 establishes a communication session with the communication system 1400. The communication session can be a wireless communication session utilizing common wireless access technologies such a GSM, CDMA, UMTS, WiFi, Bluetooth, or combinations thereof. In one embodiment, the communication device 100 can identify in step 1504 the communication system 100 from an identifier supplied thereby. The communication identifier can be a public land mobile network (PLMN) identifier as defined by 3GPP standard, a service set identifier (SSID), Cell Identifier (CELL Id in the 3GPP standard) or another form of identification which can identify a communication element of the communication system 1400 such as a cellular base station or other common wireless access points such as a WiFi access point.

In step 1506, the communication device 100 can select a profile according to the identifier. The profile can represent a set of instructions, a look-up table, or combinations thereof for provisioning the tunable matching network 202. The profile can among other things include time-of-day provisioning information, provisioning information associated with an operating location of the communication device, provisioning information for tuning a receiver portion of the communication device, or provisioning information for tuning a transmitter portion of the communication device.

Any one or combinations of the foregoing embodiments of provisioning information can direct the communication device 100 to provision the tunable matching network 202 to adapt performance parameters of the transmitter portion and/or the receiver portion of the transceiver 102 of FIG. 1 according to time-of-day considerations such as high and low network traffic conditions; the operating location of the communication device 100 such as metropolitan roaming, suburban roaming and so on; or specific tuning instructions for the receiver portion and/or transmitter portion. These embodiments are non-limiting. Accordingly, other suitable provisioning instructions are contemplated by the present disclosure.

The provisioning information included in the profile can be determined by a network operator from uplink and/or downlink communication characteristics of the communication system 1400. The performance parameters of the communication device 100 can include without limitation power consumption of the communication device 100, radiated power of the transmitter portion of the communication device, linearity of the transmitter portion, a receive sensitivity of the receiver portion of the communication device, or channel selectivity of the receiver portion.

The provisioning information can be used to control an operating efficiency of the transceiver 102, battery life, or other common desirable performance metrics. The provisioning information can also be used to improve an operating characteristic of the receiver portion of the communication device 100 at the expense of an operating characteristic of the transmitter portion of the communication device 100 and vice-versa.

In another embodiment, the tunable matching network 202 can be used as a tunable filter network for controlling an operation of the receiver or transmitter portions. The provisioning information supplied in the profile can be used for example to alter a filter that detunes the receiver portion, which may have useful consequences as will be discussed below.

Steps 1508-1512 present additional embodiments for utilizing a profile. For example, in one embodiment, the communication device 100 can receive a request from the communication element of the communication system 1400 to utilize a particular profile, which it can select in step 1510. In one embodiment, the communication device 100 can receive the profile (a supplement to an existing profile, or a modification thereto) from the communication element in step 1512. Responsive to the embodiments of steps 1504-1512, the communication device 100 can provision the tunable matching network 202 in step 1514.

In another embodiment, the communication device 100 can be programmed to determine a need to auto-tune without instructions from the communication system 1400 and/or independent of the communication system 1400 from which the communication device operates. The communication device 100 can make this determination in step 516. The auto-tune condition can be determined from the profile which can identify receiver or transmitter operating characteristics that warrant an adjustment to the performance parameters of the communication device 100 by way of an adaptation of tuning states of the tunable matching network 202. For instance, if the link margin for the receiver and transmitter is high, the communication device 100 can independently choose to auto provision the tunable matching network 202 to improve the power consumption of the communication device.

The adapted performance parameters of the communication device 100 managed according to aspects of the profile described above can be used by a communication element of the communication system 1400 to adapt in step 1520 communication services of a population of communication devices served thereby. For example, a communication element can offer increased system capacity as a result of a number of communication devices 100 optimizing transmitter linearity to reduce in band interference, and thereby improve overall system capacity.

Generally speaking, different network operators (carriers) can deploy their infrastructure (base stations and antenna towers and antenna systems) differently from each other, and correspondingly some networks may be "uplink limited" and some "downlink limited". This means that in some networks the link between the handset transmitter and the base station receiver may have less total loss in it than the link between the base station transmitter and handset receiver or vice-versa. In such situations the tunable matching network 202 in the handset could be altered to accommodate such differences.

For instance, in the case where a network is downlink limited it would be appropriate for the handset antenna tuner of the communication device 100 to emphasize the improvement in the match to the antenna in the handset's receive band at the expense of the match in the transmit band. This can be a way to improve overall performance or link margin to that particular network. Conversely if a network were uplink limited, then it can be appropriate to improve the match in the handset's transmit band at the expense of the receive band.

If this information is known, the tuner look-up tables referred to above can be expanded to include the input of network identity (PLMN for example), with appropriately different tuner settings for different communication networks. In addition, even within a network (PLMN) the look-up table can be specific to individual Cell Site Identities, if the network operator knows of a particular issue in certain locations within his network.

There is yet another aspect to consider when determining the settings for a tunable matching network 202, and that is to autonomously determine the optimal settings based upon actual transmitter and receiver conditions in the handset itself. Cellular handset transmitters, for example, commonly utilize power amplifiers which can be adjusted to a range of output power levels upon direction from the base station to which they are communicating. The handset controller can be aware of the transmit power setting at any instant, and it can also be aware of the received signal strength being received from the base station at any instant as well.

With the knowledge of these transmit and receive levels the controller can determine if the antenna match should be altered to improve the match in the transmit or receive band. In the case where both the uplink and downlink paths have margin (the transmitter is at a lower power level and the receiver sees high signal power) the tunable match can be adjusted to a position that optimizes transmitter efficiency (to reduce current drain, and thereby improve battery life) or to a position that optimizes transmitter linearity (to reduce in band interference to improve overall system capacity).

Another potential use of the tunable matching network 202 is to intentionally de-tune, or degrade the performance of the match in the receive band, while maintaining a good match (for either transmit power, efficiency or linearity) in the transmit band of the handset. A reason for doing so would be to make the receiver less sensitive and correspondingly less susceptible to local interfering signals. As before, by detecting a strong desired received signal the handset controller can autonomously set the tuner to a state that would increase the loss in the receiver path inside the handset while maintaining a good match to the transmitter.

Another embodiment is to consider the tunable matching network 202 as a tunable filter network. Correspondingly, intentionally detuning the network in the receive band is equivalent to tuning the passband of a filter to include only the transmit band but to partially reject the receive band.

It is also possible that a network operator would prefer that when handsets are in a situation with good link margin (both uplink and downlink) they preferentially tune the antenna match to a position that would improve either current drain or linearity based upon the actual time of day. During particular times of the workday (during rush hours for example) the network operator may prefer to optimize handset linearity to optimize network capacity during those times of heavy phone-call traffic.

Such network preferential tuning can be loaded into the look-up table at the time the handset is manufactured, but it can be useful for the operator to be able to re-program, or provision this information over the air. This would give the operator flexibility to enhance the operation of communication devices 100 operating in the communication system 1400 each time changes are made to the system, or conditions are discovered in the system that impact the overall performance which could be improved by modifying how the handsets work when encountering those conditions. There are several ways this provisioning can be accomplished in wireless networks. For example, profiles can be supplied in Short Message Services (SMS), WAP PUSH, Multimedia Messaging Service (MMS) message, direct data channel connection over an internet protocol, SIM Took Kit messages, an over the air standard specified by the Open Mobile Alliance (OMA), or via proprietary methods such as used in iPhone or Android based phone.

Another implementation of a tuning application can be to incorporate it into the 3GPP SIM Toolkit specification. The tuning application can receive lookup table information from a corresponding tuning application in the communication system. This lookup table can contain any number of parameters relating to how the handset should perform such as linearity, detuning, transmit weighted, receive weighted, battery life weighted, etc. The network tuning application can also furnish other specific information relating to when or where a particular performance profile should be chosen, for example:

Network Id (PLMN in the 3GPP standard)
Cell Identifier (CELL Id in the 3GPP standard)
time of day
day of the week
manufacturer ID (part of the handset serial number e.g. 3GPP IMEI)

The handset can, with the proper lookup table, apply all of these parameters to a specific performance profile. The network tuning application can select specific profiles for handset manufacturers and model and target these handsets with specific performance profiles with the goal of attaining more uniform performance in particular communication cell areas.

From the foregoing descriptions, it would be evident to an artisan with ordinary skill in the art that the aforementioned embodiments can be modified, reduced, or enhanced without departing from the scope and spirit of the claims described below. For example, methods 800 and 1400 of FIGS. 8 and 14 can be adapted to be used for calibrating and provisioning a tunable matching network of a wireline transceiver. Methods 800 and 1400 can be applied to innumerable combinations of use cases, bands, sub-sets of bands, and other performance parameters which have not been addressed in the present disclosure. These undisclosed combinations are contemplated by the present disclosure.

Other suitable modifications can be applied to the present disclosure. Accordingly, the reader is directed to the claims for a fuller understanding of the breadth and scope of the present disclosure.

Figure 16:
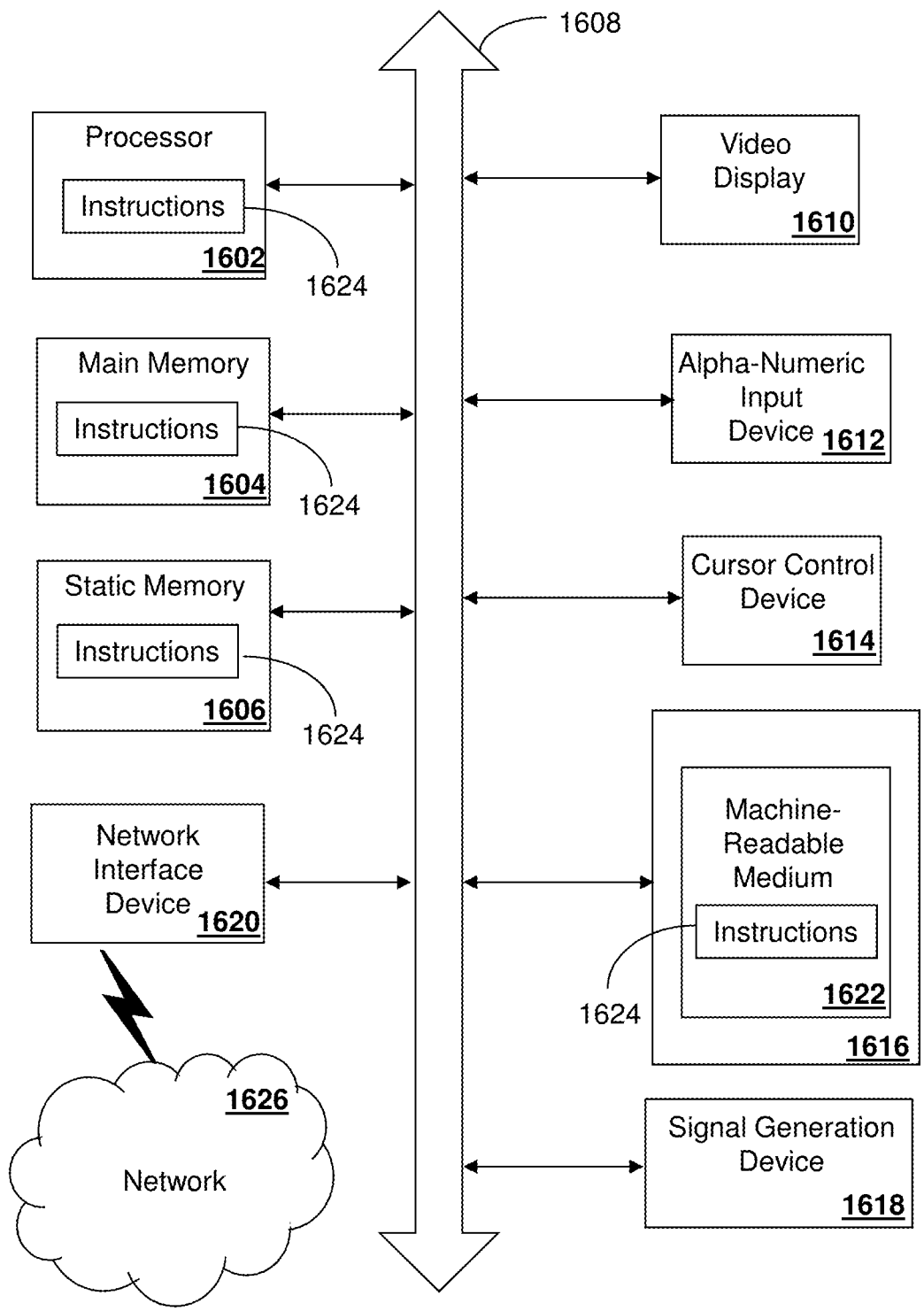
FIG. 16 depicts an exemplary diagrammatic representation of a machine in the form of a computer system within which a set of instructions, when executed, may cause the machine to perform any one or more of the methodologies disclosed herein.

FIG. 16 depicts an exemplary diagrammatic representation of a machine in the form of a computer system 1600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1600 may include a processor 1602 (e.g., a central processing unit (CPU), a graphics processing unit (GPU, or both), a main memory 1604 and a static memory 1606, which communicate with each other via a bus 1608. The computer system 1600 may further include a video display unit 1610 (e.g., a liquid crystal display (LCD), a flat panel, a solid state display, or a cathode ray tube (CRT)). The computer system 1600 may include an input device 1612 (e.g., a keyboard), a cursor control device 1614 (e.g., a mouse), a disk drive unit 1616, a signal generation device 1618 (e.g., a speaker or remote control) and a network interface device 1620.

The disk drive unit 1616 may include a machine-readable medium 1622 on which is stored one or more sets of instructions (e.g., software 1624) embodying any one or more of the methodologies or functions described herein, including those methods illustrated above. The instructions 1624 may also reside, completely or at least partially, within the main memory 1604, the static memory 1606, and/or within the processor 1602 during execution thereof by the computer system 1600. The main memory 1604 and the processor 1602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1624, or that which receives and executes instructions 1624 from a propagated signal so that a device connected to a network environment 1626 can send or receive voice, video or data, and to communicate over the network 1626 using the instructions 1624. The instructions 1624 may further be transmitted or received over a network 1626 via the network interface device 1620.

While the machine-readable medium 1622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   receiving, by a wireless communication device, network condition information from a communication element that is remote from the wireless communication device, wherein the network condition information does not include settings for a variable reactance element of a matching network of the wireless communication device;
   selecting, by the wireless communication device, a profile from among a plurality of profiles based on an identification of the communication element, wherein each profile of the plurality of profiles includes tuning information for the matching network;
   determining, by the wireless communication device, a desired operational metric according to the network condition information;
   determining, by the wireless communication device, a relative position of a body part of a user and the wireless communication device;
   determining, by the wireless communication device, a use case for the wireless communication device according to relative position of the body part of the user;
   determining, by the wireless communication device, a tuning state for the matching network via the tuning information of the profile according to the desired operational metric and the use case; and
   adjusting, by the wireless communication device, the variable reactance element according to the tuning state to perform impedance matching.

2. The method of claim 1, further comprising receiving, by the wireless communication device, a provisioning instruction from a communication system to which the communication element belongs.

3. The method of claim 1, wherein the communication element is a cellular base station or a wireless local area network access point.

4. The method of claim 1, wherein the desired operational metric includes one of radiated transmit power, receive sensitivity, transmit linearity, power amplifier efficiency, or any combination thereof.

5. The method of claim 1, wherein the determining of the desired operational metric comprises determining a plurality of desired operational metrics, and further comprising receiving, by the wireless communication device from the communication element, weighting factors to be applied to at least some of the plurality of desired operational metrics for determining the tuning state.

6. The method of claim 1, further comprising determining, by the wireless communication device, an operational frequency band for a wireless communication link between the wireless communication device and the communication element, wherein the determining of the tuning state is further according to the operational frequency band that is determined.

7. The method of claim 1, wherein the determining of the relative position of the body part of the user and the wireless communication device is via a proximity sensor.

8. The method of claim 1, further comprising determining, by the wireless communication device, a physical orientation of the wireless communication device, wherein the determining of the use case is further according to the physical orientation that is determined.

9. The method of claim 1, further comprising selecting, by the wireless communication device, the tuning state that is determined from a plurality of desired tuning states.

10. A non-transitory machine-readable storage medium, comprising executable instructions which, responsive to being executed by a processing system including a processor of a wireless communication device, cause the processing system to perform operations comprising:
    receiving, from a communication element over a wireless communication link, network condition information without receiving settings for a variable reactance element of a matching network of the wireless communication device;
    selecting a profile from among a plurality of profiles based on an identification of the communication element, wherein each profile of the plurality of profiles includes tuning information for the matching network;
    determining a desired operational metric according to the network condition information;
    detecting a connection between the wireless communication device and a wireless headset device;
    determining a use case for the wireless communication device according to the detecting the connection between the wireless communication device and a wireless headset device;
    determining a tuning state for the matching network via the tuning information of the profile according to the desired operational metric and the use case; and
    adjusting the variable reactance element according to the tuning state to perform impedance matching.

11. The non-transitory machine-readable storage medium of claim 10, wherein the desired operational metric comprises a first desired operational metric and a second desired operational metric, and wherein the determining of the tuning state further comprises providing a compromise between the first desired operational metric and the second desired operational metric.

12. The non-transitory machine-readable storage medium of claim 11, wherein the first desired operational metric is associated with transmitter performance, and wherein the second desired operational metric is associated with receiver performance.

13. The non-transitory machine-readable storage medium of claim 10, wherein the determining the use case for the wireless communication is further according to determining a relative position of a body part of a user and the wireless communication device.

14. The non-transitory machine-readable storage medium of claim 13, wherein the determining the relative position of the body part of the user and the wireless communication device is via a proximity sensor.

15. The non-transitory machine-readable storage medium of claim 10, wherein the operations further comprise determining an operational frequency band for the wireless communication link, wherein the determining of the tuning state is further according to the operational frequency band that is determined.

16. The non-transitory machine-readable storage medium of claim 10, wherein the determining the use case for the wireless communication device is further according to determining a physical orientation of the wireless communication device.

17. The non-transitory machine-readable storage medium of claim 10, wherein the operations further comprise selecting the tuning state that is determined from a plurality of desired tuning states.

18. A wireless communication device, comprising:
a processing system including a processor; and
a memory that stores executable instructions that, when executed by the processing system, facilitate performance of operations, comprising:
receiving, from a communication element over a wireless communication link, network condition information;
selecting, by the wireless communication device, a profile from among a plurality of profiles based on an identification of the communication element, wherein each profile of the plurality of profiles includes tuning information for a matching network;
determining a desired operational metric according to the network condition information;
determining a use case for the wireless communication device;
determining a tuning state for the matching network via the tuning information of the profile according to the desired operational metric and the use case; and
adjusting a variable reactance element of the matching network according to the tuning state to perform impedance matching.

19. The wireless communication device of claim 18, wherein the network condition information is received without receiving settings for the variable reactance element of the matching network of the wireless communication device.

20. The wireless communication device of claim 18, wherein the determining the use case for the wireless communication device is further according to determining a physical orientation of the wireless communication device, and detecting a connection between the wireless communication device and a wireless headset device.

* * * * *